(12) United States Patent
Adachi et al.

(10) Patent No.: US 9,829,622 B2
(45) Date of Patent: Nov. 28, 2017

(54) ILLUMINATING DEVICE AND LIQUID CRYSTAL DISPLAY DEVICE

(75) Inventors: Masaya Adachi, Hitachi (JP); Tatsuya Sugita, Takahagi (JP)

(73) Assignees: PANASONIC LIQUID CRYSTAL DISPLAY CO., LTD., Hyogo-Ken (JP); JAPAN DISPLAY INC., Tokyo (JP)

(*) Notice: Subject to any disclaimer, the term of this patent is extended or adjusted under 35 U.S.C. 154(b) by 1106 days.

(21) Appl. No.: 13/029,265

(22) Filed: Feb. 17, 2011

(65) Prior Publication Data

US 2011/0221998 A1    Sep. 15, 2011

(30) Foreign Application Priority Data

Mar. 12, 2010    (JP) ................. 2010-056186

(51) Int. Cl.
*F21V 8/00* (2006.01)
*G02F 1/1335* (2006.01)

(52) U.S. Cl.
CPC .......... *G02B 6/0038* (2013.01); *G02B 6/0036* (2013.01); *G02B 6/0056* (2013.01); *G02B 6/0068* (2013.01); *G02B 6/0073* (2013.01); *G02F 1/133615* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,729,311 | A * | 3/1998 | Broer et al. | 349/65 |
| 6,384,881 | B1 | 5/2002 | Arai et al. | |
| 6,940,570 | B1 * | 9/2005 | Sumida et al. | 349/61 |
| 2001/0002165 | A1 * | 5/2001 | Shinohara et al. | 362/31 |
| 2004/0042233 | A1 * | 3/2004 | Suzuki | G02B 6/0028 362/561 |
| 2008/0297699 | A1 | 12/2008 | Shimazaki et al. | |

(Continued)

FOREIGN PATENT DOCUMENTS

| | | |
|---|---|---|
| JP | 10-020125 | 1/1998 |
| JP | 11-142849 | 5/1999 |

(Continued)

OTHER PUBLICATIONS

U.S. Appl. No. 12/943,157, filed Nov. 10, 2010, Araki et al.

*Primary Examiner* — Edward Glick
*Assistant Examiner* — Anthony G Quash
(74) *Attorney, Agent, or Firm* — Hauptman Ham, LLP

(57) ABSTRACT

An illuminating device includes: a light source; a light guide plate which converts light emitted from the light source into a surface light ray and emits the surface light ray through a front surface of the light guide plate; and an optical sheet which changes a propagation direction of the surface light ray emitted from the light guide plate. The light source is arranged in opposition to one end surface of the light guide plate. A polarization state converting structure to convert a polarization state of the light propagating through the light guide plate is provided in a rear surface of the light guide plate. The polarization state converting structure contains an inclination plane having a ridge line extending in a direction perpendicular to the extension direction of the one end surface.

15 Claims, 22 Drawing Sheets

(56) References Cited

U.S. PATENT DOCUMENTS

| | | | | |
|---|---|---|---|---|
| 2010/0123854 A1* | 5/2010 | Adachi | ............... | F21V 7/04 349/61 |
| 2010/0123856 A1* | 5/2010 | Arai et al. | ............... | 349/62 |
| 2010/0277669 A1* | 11/2010 | Adachi et al. | ............... | 349/62 |
| 2011/0013423 A1* | 1/2011 | Selbrede et al. | ............... | 362/613 |

FOREIGN PATENT DOCUMENTS

| | | | | |
|---|---|---|---|---|
| JP | 2000-353413 | | 12/2000 | |
| JP | 3299087 | | 7/2002 | |
| JP | 2006086026 A | * | 3/2006 | |
| JP | 2006-236804 | | 9/2006 | |
| JP | 2008-032778 | | 2/2008 | |
| JP | 2008-299131 | | 12/2008 | |
| JP | 4250192 | | 4/2009 | |
| JP | 2009-211873 | | 9/2009 | |
| JP | 2009-231018 | * | 10/2009 | ............ F21V 8/00 |
| JP | 2009-259830 | | 11/2009 | |
| JP | 4395197 | | 1/2010 | |
| JP | 4410840 | | 2/2010 | |
| JP | 4448555 | | 4/2010 | |
| JP | 2010-123464 | | 6/2010 | |
| JP | 2010-262813 | | 11/2010 | |
| WO | WO 2010/010694 A1 | | 1/2010 | |

\* cited by examiner

ILLUMINATING DEVICE AND LIQUID CRYSTAL DISPLAY DEVICE

CROSS-REFERENCE TO RELATED APPLICATION

The present application claims priority from Japanese application JP2010-056186 filed on Mar. 12, 2010, the content of which is hereby incorporated by reference into this application.

BACKGROUND OF THE INVENTION

1. Field of the Invention

The present invention relates to an illuminating device and a liquid crystal display device, and more particularly, to an illuminating device which generates a surface light ray using a light guide plate, and a liquid crystal display device including the illuminating device used as a backlight.

2. Description of the Related Art

A display device is a medium to show information to persons visually and is very important for humans in the today's highly information-oriented society. In particular, the performance of a liquid crystal display device has been remarkably improved in recent years and the device is being employed as a display device equipped in a mobile phone terminal, a display device for use with a personal computer, a display device for a wide-screen television, etc. In general, such a liquid crystal display device includes a liquid crystal display panel and a backlight (illuminating device) which is placed on the rear side of the liquid crystal display panel to emit light to the liquid crystal display panel.

A liquid crystal display device having a backlight (hereinafter simply referred to as a "liquid crystal display device") displays a picture or an image by independently controlling transmission of light from the backlight for each of pixels in a liquid crystal display panel. At this point, it is preferable that the liquid crystal display panel has a pair of polarizers with a liquid crystal layer interposed therebetween and performs display by controlling a polarization state of light using the liquid crystal layer in that a picture having a high contrast ratio can be obtained with a relatively low driving voltage. Examples of display modes of such a liquid crystal display panel may include a TN (Twisted Nematic) mode, an STN (Super Twisted Nematic) mode, an ECB (Electrical Controlled Birefringence) mode, an IPS (In-Plane Switching) mode, a VA (Vertical Aligned) mode, and other modes known in the art. In any mode, the liquid crystal display panel typically includes a pair of substrates, a liquid crystal layer interposed between the pair of substrates, and a pair of polarizers with the pair of substrates and the liquid crystal layer interposed therebetween and displays a picture or an image by changing a polarization state of light using the liquid crystal layer to control transmission of light for each pixel.

The polarizers used in the liquid crystal display panel have a function to absorb one linearly polarized light component and transmit another linearly polarized light component whose polarization plane is orthogonal to the one linearly polarized light component. Therefore, if light emitted from the backlight to the liquid crystal display panel (hereinafter referred to as "backlight light") is unpolarized light, the polarizers provided in the liquid crystal display panel absorb at least 50% of the backlight light. That is, in the liquid crystal display device, if the backlight light is unpolarized light, about half of the backlight light is absorbed by the polarizers, i.e., is lost. Accordingly, it is desirable to decrease a percentage of backlight light absorbed by the polarizers provided in the liquid crystal display panel and improve use efficiency of the backlight light for implementation of a liquid crystal display device providing a brighter image and lower power consumption.

In the meantime, a backlight of the liquid crystal display device may include an edge light type backlight system (light guide type), a direct type backlight system (reflector type backlight system), a surface light source type and the like, which may be used depending on use of the liquid crystal display device. Among these types, the edge light type backlight system can achieve a backlight which is thinner, lighter and provides lower power consumption than other types and is widely used for the liquid crystal display devices equipped in a mobile phone terminal. Such an edge light type backlight includes a line or point light source, a light guide plate which expands light from the light source into surface light to be emitted to a liquid crystal display panel, optical sheets such as a prism sheet and a diffusion sheet, a reflection sheet, etc.

In the edge light type backlight (hereinafter abbreviated as "backlight"), the light emitted from the light guide plate generally has the maximum (peak) of luminance or luminous intensity in a direction inclined by 60° to 80° with respect to a perpendicular (normal) direction of a light emission plane of the light guide plate. Accordingly, between the light guide plate and the liquid crystal display panel is interposed a prism sheet which controls a traveling direction of light having maximal luminance or luminous intensity of the light emitted from the light guide plate.

The prism sheet is a transparent optical member, which generally includes a sheet-like base material and a plurality of prisms arranged on the base material. In addition, each of the prisms generally has a triangular section.

It is known that light emitted at an angle providing the maximum luminance or luminous intensity (peak angle) and an angle near the peak angle among the light emitted from the light guide plate has a greater p-polarized component than an s-polarized component. Accordingly, in recent years, there has been proposed a surface light source device (backlight) using a prism sheet which is configured to preferentially lead light having a greater p-polarized component emitted from a light guide plate toward the front direction (for example, see Japanese Patent No. 3299087).

In the surface light source device disclosed in Japanese Patent No. 3299087, each of prism arrays constituting the prism sheet has two inclined surfaces and an inclination angle of an inclined surface farther from the light source is selected to refract light having a greater p-polarized component emitted from the light guide plate toward the front direction. In addition, an inclination angle of an inclined surface relatively closer from the light source is selected to have a range within which light having a greater p-polarized component emitted from the light guide plate is not incident onto the inclined surface. In this case, it is stated in Japanese Patent No. 3299087 that illuminating light from the surface light source device is suitable for backlights of liquid crystal display devices since the illuminating light has a polarization.

SUMMARY OF THE INVENTION

As described above, it is disclosed that the light emitted from the light guide plate has the peak angle of luminance or luminous intensity in the direction inclined by 60° to 80° with respect to the perpendicular direction of the light emission plane of the light guide plate and the light emitted at the peak angle and the angle near the peak angle has a greater p-polarized component than the s-polarized component. It is believed that this is due to a difference in transmittance between the p-polarized component and the s-polarized component at an interface between the light guide plate and air.

For example, for a light guide plate constituted by a transparent medium having a refractive index of 1.58, considering light having 76° of an output angle from a surface (light output surface) of the light guide plate, that is, an angle from a perpendicular direction of the light output surface, unpolarized light becomes a light whose degree of polarization with respect to p-polarized light is about 24% in calculation by its emission from the light guide plate.

In this case, assuming that the maximum luminance and minimum luminance of the light emitted from the light guide plate are $I_{max}$ and $I_{min}$, respectively, when measured through an analyzer (polarizer) while rotating the analyzer, the degree of polarization $\rho$ is expressed by the following equation 1.

$$\rho=(I_{max}-I_{min})/(I_{max}+I_{min}) \quad \text{(Equation 1)}$$

In addition, in the present specification, assuming that luminance of light at the time when an absorption axis of the analyzer is perpendicular to the p-polarization is $I\rho_{max}$ and luminance of light at the time when the absorption axis is in parallel to the p-polarization is $I\rho_{min}$, a degree of polarization for the p-polarized light $\rho_p$ is defined by the following equation 2.

$$\rho_p=(I\rho_{max}-I\rho_{min})/(I\rho_{max}+I\rho_{min}) \quad \text{(Equation 2)}$$

The present inventors have measured a degree of polarization for the p-polarized light $\rho_p$ of light emitted from a light guide plate based on Equation 2 and obtained a result shown in FIG. 36 which is a graph showing an example of a relationship between an output angle $\alpha$ of light emitted from a light guide plate and a degree of polarization for p-polarized light in an existing light guide plate, where a horizontal axis represents the output angle of the light emitted from the light guide plate and a vertical axis represents the degree of polarization $\rho_p$ for p-polarized light. In the graph of FIG. 36, a lower line having circles represents a result of measurement made by the present inventors using an analyzer (measured values) and an upper curve represents a degree of polarization for p-polarized light calculated from the difference between refractive indexes of the light guide plate and air (calculated values).

As can be seen from FIG. 36, measured values of the degree of polarization $\rho_p$ for p-polarized light in the light emitted through a front surface of the light guide plate are smaller than calculated values calculated from a refractive index of the light guide plate and a refractive index of air. The degree of polarization $\rho_p$ for p-polarized light in light whose output angle $\alpha$ is 76° is about 24% in calculation but in actuality is less, being about 13%.

It is believed that the reason why the measured values of the degree of polarization $\rho_p$ for p-polarized light are lesser than the calculated values is that light remaining in the light guide plate after being reflected from an interface between air and the light guide plate has a high percentage of s-polarized light component unlike output light. That is, although light emitted from the light guide plate has a high percentage of p-polarized light component, light remaining in the light guide plate and propagating into the light guide plate has a high percentage of s-polarized light component to the same extent. Thus, in actuality, it is believed that the light emitted from the light guide plate has a lower degree of polarization of p-polarized light than a calculated value produced under the presumption that light propagating into the light guide plate is unpolarized light.

In a liquid crystal display device, a transmission axis in one of a pair of polarizers provided in a liquid crystal display panel, which is closer to a backlight, is set to be substantially parallel to a vibration direction of p-polarized light in light emitted from a light guide plate. Thus, in order to increase use efficiency of backlight light, it is considered that it is effective to increase a percentage of p-polarized light component in the light emitted from the light guide plate.

However, as described above, such an existing backlight has a problem of insufficient increase in a percentage of p-polarized light component (degree of polarization $\rho_p$ for p-polarized light) in the light emitted from the light guide plate.

It is an object of the present invention to provide a technique which is capable of efficiently increasing a degree of polarization of light emitted from a light guide plate in an edge light type illuminating device.

It is another object of the present invention to provide a technique which is capable of increasing use efficiency of light emitted from a backlight in a liquid crystal display device including an edge light type illuminating device (backlight).

These and other objects, features and advantages of the present inventions will be better understood when reading from the following detailed description and the accompanying drawings.

Several representatives of the inventions defined in the specification may be outlined as follows.

(1) An illuminating device including: a light source; a light guide plate which converts light emitted from the light source into a surface light ray and emits the surface light ray through a front surface of the light guide plate; and an optical sheet which changes a propagation direction of the surface light ray emitted from the light guide plate, wherein the light source is arranged in one end surface different from the front surface in the light guide plate, wherein the light guide plate has birefringence in at least an in-plane direction of the front surface and is formed of a transparent medium having a slow axis in parallel to a longitudinal direction of the end surface, wherein a polarization state converting structure to convert a polarization state of the light propagating through the light guide plate is provided in a surface opposing the front surface in the light guide plate, and wherein the polarization state converting structure includes an inclination plane having a ridge line in a direction different from a direction in parallel to the longitudinal direction of the end surface.

(2) An illuminating device including: a light source; a light guide plate which converts light emitted from the light source into a surface light ray and emits the surface light ray through a front surface of the light guide plate; a high refractive index layer formed on the front surface of the light guide plate; and an optical sheet which changes a propagation direction of the surface light ray emitted from the light guide plate, wherein the light source is arranged in one end surface different from the front surface in the light guide plate, wherein the high refractive index layer has a refractive index higher than a refractive index of the light guide plate, wherein a polarization state converting structure to convert a polarization state of the light propagating through the light guide plate is provided in a surface opposing the front surface in the light guide plate, and wherein the polarization state converting structure includes an inclination plane having a ridge line in a direction different from a direction in parallel to the longitudinal direction of the end surface.

(3) A liquid crystal display device including: an illuminating device according to any one of the items (1) and (2); and a liquid crystal display panel which is arranged in the propagation direction of the surface light ray emitted from the illuminating device, wherein the liquid crystal display panel includes a pair of polarizers arranged with a liquid crystal layer interposed between the pair of polarizers, and wherein a direction of an absorption axis of the polarizer arranged closer to the illuminating device, of the pair of polarizers, is set such that an angle formed with the longitudinal direction of the end surface of the light guide plate of the illuminating device is smaller than an angle formed with a direction perpendicular to the longitudinal direction.

According to the present invention, an illuminating device is capable of efficiently increasing a degree of polarization of light emitted from a light guide plate.

According to the present invention, a liquid crystal display device is capable of increasing use efficiency of light emitted from a backlight.

DETAILED DESCRIPTION OF THE INVENTION

Figure 1:
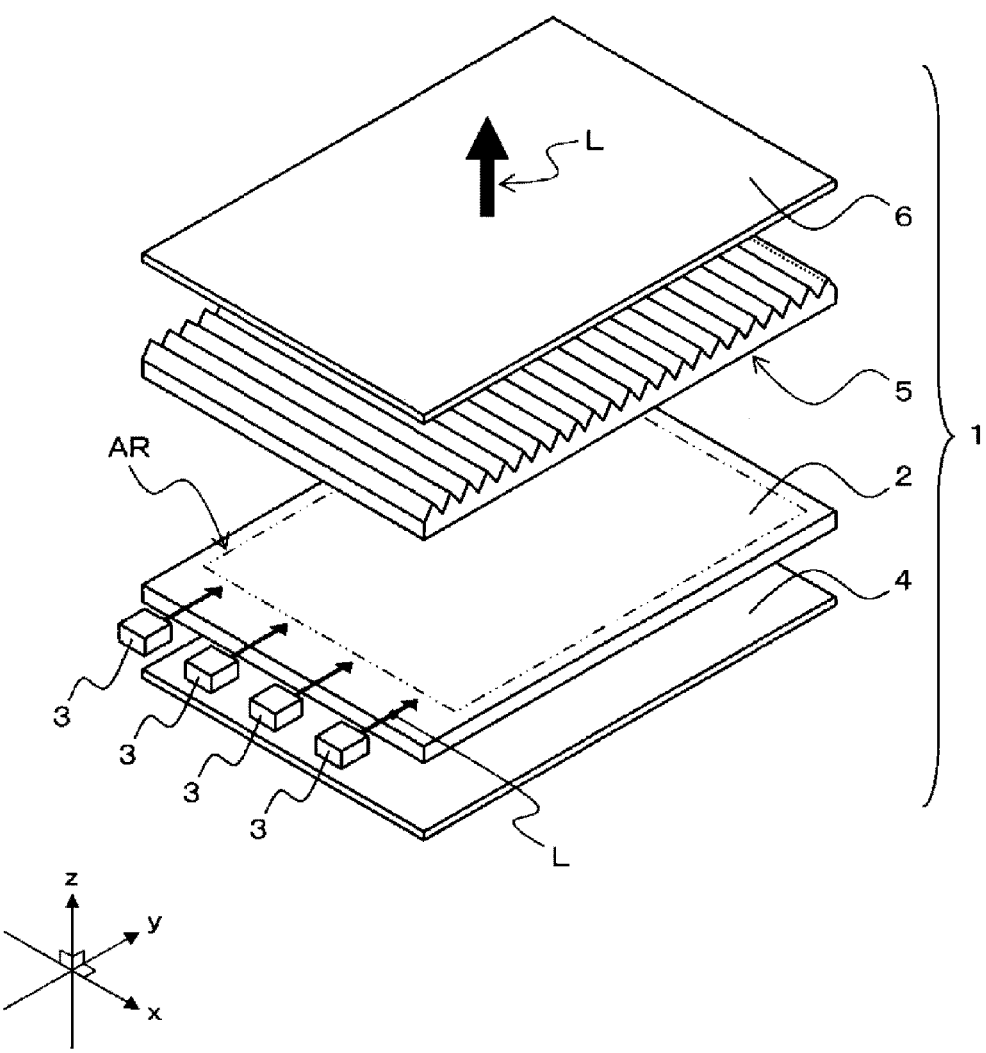
FIG. 1 is a schematic perspective view showing a general configuration of main portions of an illuminating device according to a first embodiment of the present invention.

First, several main configurations of an illuminating device according to one embodiment of the present invention will be outlined below.

The illuminating device according to this embodiment includes at least a light source which emits point or line light, a light guide plate which converts the light emitted from the light source (hereinafter referred to as light source light) into a surface light ray to be emitted therefrom, and an optical sheet which change a propagation direction of the light ray emitted from the light guide plate and a reflector.

The main configurations of the illuminating device of this embodiment are as follows:

(Configuration 1) The light guide plate is configured such that an output angle providing the maximum luminance or luminous intensity (hereinafter referred to as a peak angle) of light emitted through its front surface is inclined by 60° to 85° with respect to a perpendicular direction of the front surface of the light guide plate.

(Configuration 2) A polarization state converting structure to convert a polarization state of light propagating into the light guide plate is provided in a surface (hereinafter referred to as a rear side) opposing the front surface of the light guide plate. The polarization state converting structure includes an inclination plane having a ridge line, for example, the ridge line is in a direction perpendicular to a side (end surface) of the light guide plate in which the light source is arranged.

(Configuration 3) The optical sheet is configured to refract light, which is incident at the peak angle, of light emitted through the front surface of the light guide plate, in the front direction (perpendicular direction of the front surface), and specifically employs a prism sheet. The prism sheet includes a transparent medium which phase difference is not caused easily when the light emitted from the light guide plate at the peak angle passes through the prism sheet.

The light guide plate includes preferably one or both of the following configurations in addition to Configuration 1 and Configuration 2.

(Configuration 4) The light guide plate is formed of a transparent medium having birefringence and its slow axis is approximately or strictly parallel to a side of the light guide plate in which the light source is arranged.

(Configuration 5) A high refractive index layer having a refractive index higher than a refractive index of the light guide plate is provided in the front surface of the light guide plate. Assuming that the refractive index of the high refractive index layer is $n_h$, an angle at which light emitted at the peak angle from the light guide plate propagates into the high refractive index layer (an inclined angle from a direction perpendicular to a light output surface of the light guide plate) is $\xi$, and a thickness of the high refractive index layer is $d_h$, the high refractive index layer preferably satisfies the following equation 3. In Equation 3, $\lambda$ is a visible wavelength and m is an integer.

$$d_h = \lambda/(4 \cdot n_h \cdot \cos \xi) \cdot (2m+1) \quad \text{(Equation 3)}$$

The above Configurations 1 to 5 operate in the illuminating device of this embodiment as follows.

First, according to Configuration 1, light emitted from the light guide plate can include a high percentage of p-polarized light component. For example, for the light guide plate in which the peak angle of the luminance falls within a range of 75° to 80°, it is well known that light emitted at or near the peak angle of the luminance includes a greater p-polarized light component than s-polarized light component.

However, in Configuration 1, since reflection of the s-polarized light component at the front surface of the light guide plate (an interface between the light guide plate and air) is high, light staying within the light guide plate has a large s-polarized light component if there is no measure to solve this problem.

In contrast, in the illuminating device of this embodiment, according to Configuration 2, when light reflected from the front surface of the light guide plate is reflected from the rear side of the light guide plate and again incident onto the front surface, a polarization state of the light is changed. At this time, specifically, the light again incident onto the front surface has a decreased percentage of s-polarized light component and an increased percentage of p-polarized light component. That is, since the s-polarized light component in the light staying within the light guide plate is prevented from being increased due to the polarization state converting structure arranged in the rear side of the light guide plate, the light emitted through the front surface of the light guide plate has a higher percentage of p-polarized light component.

Configuration 3 can prevent a change in a polarization state when the light emitted from the light guide plate at the peak angle passes through the prism sheet. Accordingly, p-polarized light passing through the prism sheet remains in a p-polarization state. Particularly if the prism array is provided in a side in the opposite to the light guide plate, light incident into the prism sheet is refracted at an interface with air in both of the rear and front surfaces of the prism sheet. In this refraction, since a transmittance of p-polarized light component is higher than that of s-polarized light component, the amount of light passing through the prism sheet is increased with increase in the percentage of the p-polarized light component in the light emitted through the front surface of the light guide plate.

Configuration 4 and Configuration 5 provide an increased transmittance of p-polarized light component and an increased reflectance of s-polarized light component, respectively, when the light emitted from the light guide plate at the peak angle passes through the interface between the light guide plate and air. Accordingly, with one or both of Configuration 4 and Configuration 5, the light emitted from the light guide plate at the peak angle has an even higher percentage of p-polarized light component. In addition, Configuration 4 and Configuration 5 are effective for the realization of a light guide plate which emits a higher percentage of p-polarized light component since at least some of s-polarized light component reflected from the interface between the light guide plate and air is converted into p-polarized light component in the polarization state converting structure due to a synergy effect with Configuration 2.

In this manner, by constructing an illuminating device including some or all of Configurations 3 to 5 on the basis of Configurations 1 and 2, it is possible to obtain illuminating light having a great amount of linearly polarized light component (p-polarized light component).

Hereinafter, various exemplary embodiments of the present invention will be described in detail with reference to the accompanying drawings.

Prior to the description, the same elements and functions are denoted by the same reference numerals throughout the drawings and explanation thereof will not be repeated.

First Embodiment

Figure 2:
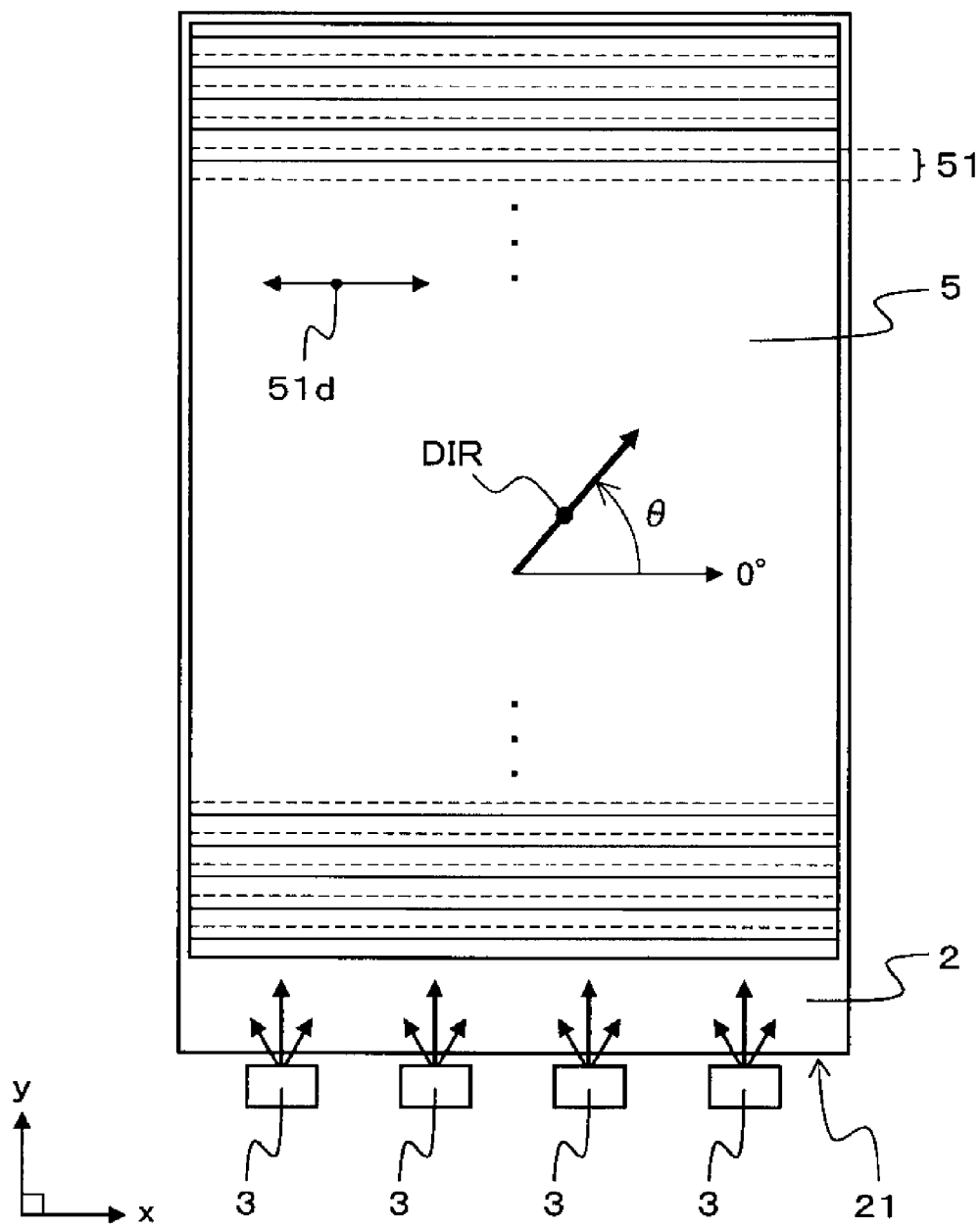
FIG. 2 is a schematic plan view showing an example of a planar configuration of the illuminating device.

FIGS. 1 and 2 are schematic views showing a general configuration of an illuminating device according to a first embodiment of the present invention.

FIG. 1 is a schematic perspective view showing a general configuration of main portions of the illuminating device according to the first embodiment of the present invention. FIG. 2 is a schematic plan view showing an example of a planar configuration of the illuminating device.

An illuminating device 1 according to the first embodiment includes, for example, a light guide plate 2, a plurality of light sources 3, a reflection sheet 4, a prism sheet 5 and a diffusion sheet 6, as shown in FIGS. 1 and 2.

The light guide plate 2 is a transparent plate-like optical part to convert light L emitted from the light sources 3 into a surface light ray and has Configuration 1 and Configuration 2 as described earlier. The light guide plate 2 is interposed between the reflection sheet 4 and the prism sheet 5 and is configured to emit the light L emitted from the light sources 3 mainly from an area AR facing the prism sheet 5. In the following description, in the light guide plate 2, an area facing the prism sheet 5 is referred to as a front surface or a light emission surface and an area facing the reflection sheet 4 is referred to as a rear side.

The light guide plate 2 has a rectangular planar front surface. In the specification, in a light emission surface of the light guide plate 2, a short side direction refers to an x-axis direction and a long side direction refers to a y-axis direction. In addition, in the specification, a perpendicular direction of the front surface refers to a z-axis direction and a z-axis direction directed from the light emission surface to the prism sheet 5 refers to a +z direction. In addition, in the following description of the specification, the short side direction and the long side direction of the light guide plate 2 refer to a short side direction and a long side direction in the front surface, respectively. A detailed configuration of the light guide plate 2 will be described later.

The light sources 3 are preferable to satisfy conditions of compactness, high emission efficiency and low heat generation and examples of such light sources may include cold-cathode fluorescent tubes and light emitting diodes (LEDs). Although it is illustrated in the first embodiment that light emitting diodes are used as the light sources 3, it should be understood that the present invention is not limited thereto.

If the light emitting diodes are used as the light sources 3, since the light emitting diodes are point light sources, a plurality of (4 in FIGS. 1 and 2) light sources 3 is arranged along an end surface 21 in the short side direction of the light guide plate 2, for example, as shown in FIGS. 1 and 2. It is to be understood that the number and arrangement side of the light sources 3 may be changed as necessary.

For example, the light sources 3 may employ light emitting diodes emitting white light. It is known that such white light emitting diodes realize white light emission, for example by combining a light emitting diode chip to emit blue light and a phosphor to be excited by the blue light emitted by the light emitting diode chip to thereby emit yellow light. It is also known that such white light emitting diodes realize white light emission having peak emission wavelengths at blue, green and red colors, for example by combining a light emitting diode chip to emit blue light or ultraviolet light and a phosphor to be excited by the light emitted by the light emitting diode chip to thereby emit light.

The illuminating device 1 according to the first embodiment is thin and can emit illuminating light having a large percentage of predetermined polarization component and is suitable as, for example, a backlight of a liquid crystal display device. If the illuminating device 1 of the first embodiment is used as a backlight of a liquid crystal display device corresponding to color display by additive color mixing, light emitting diodes to emit three primary colors of, for example, red, green and blue may be used as the light sources 3. If the illuminating device 1 of the first embodiment is used in combination with a color liquid crystal display panel, a display device having a wide color gamut can be realized by using the light sources 3 having a peak emission wavelength corresponding to a transmission spectrum of color filters in the liquid crystal display panel. In addition, in the case of a color field sequential liquid crystal display device, since there is no need to provide color filters, which may cause an optical loss, in a liquid crystal display panel, a display device having low optical loss and a wide color gamut can be realized by using light emitting diodes to emit three primary colors of red, green and blue as the light sources 3.

In addition, although not shown, the light sources 3 are connected to a power supply, a controller to control turning on/off of the light sources, etc. via wirings.

The reflection sheet 4 arranged in a rear side of the light guide plate 2 serves to return light emitted from the rear side of the light guide plate 2 to the light guide plate 2 for its effective use. For example, the reflection sheet 4 may include a base material such as a resin plate or a polymer film and a reflection layer having a high reflectance formed on the base material. The reflection layer may be formed by, for example, forming a metallic thin film having a high reflectance such as aluminum or silver on the base material using an evaporation method or a sputtering method, or forming a dielectric multilayer as a high reflecting layer on the base material, or coating the base material with light reflective paints. In addition, the reflection sheet may act as a reflector by, for example, stacking a plurality of transparent media having different refractive indexes.

The prism sheet 5 arranged in the front surface of the light guide plate 2 is an optical sheet to change a propagation direction of light emitted from the front surface of the light guide plate 2. For example, the prism sheet 5 has a prism array including a plurality of prisms and, as shown in FIGS. 1 and 2, a ridge line 51d in each of prisms 51 extends in parallel to the short side direction of the light guide plate 2. In the first embodiment, detailed explanation about the prism sheet 5 will be omitted as it may be typically used in existing illuminating devices. A preferred configuration (sectional shape) of the prisms 51 in the prism sheet 5 will be described later.

The diffusion sheet 6 arranged on the prism sheet 5 when viewed from the light guide plate 2 serves to diffuse the light redirected by the prism sheet 5, for example in order to widen a distribution of an output angle of the light L emitted from the illuminating device 1 or make a surface luminance of the light L uniform. Detailed explanation about the diffusion sheet 6 will be omitted as it is typically used in existing illuminating devices.

An angle θ of a direction DIR shown in FIG. 2 is an azimuth angle which will be described below. As shown in FIG. 2, for the azimuth angle θ, the short side direction of the light guide plate 2 is assumed to be 0 degrees and a counterclockwise direction is assumed to be positive when viewing the light guide plate 2 from above the light emission surface.

Figure 3:
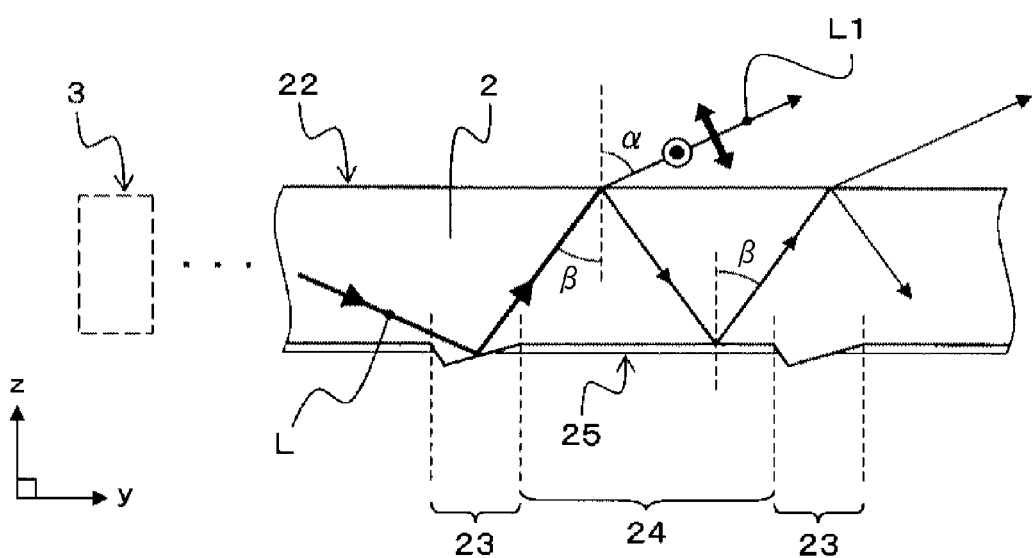
FIG. 3 is a schematic sectional view showing an example of a sectional configuration of a light guide plate in the illuminating device according to the first embodiment.

FIG. 3 is a schematic sectional view showing an example of a sectional configuration of the light guide plate in the illuminating device according to the first embodiment.

FIG. 3 shows a sectional configuration viewed from a section in parallel to a yz plane in an xyz coordinate system shown in FIG. 1 and a configuration viewed in the depth direction of the section.

As shown in FIG. 3, for example, the light guide plate 2 acts to propagate the light L emitted from the light sources 3 and incident through its one end surface 21 and emit a portion of the light L through its front surface 22, thereby converting the light L into surface-shaped light. In this case, the light guide plate 2 is formed of a substantially rectangular plate-like member transparent to visible light and has a structure 23 to emit the light L, which is incident through the end surface 21 and propagates through the light guide plate 2, through the front surface 22 (hereinafter referred to as a "light extraction structure"). In the first embodiment, an example of the light extraction structure 23 may include a V-shaped structure provided in the rear side of the light guide plate 2, as shown in FIG. 3.

In addition, the light extraction structure 23 may be realized with a structure to change the propagation angle (an incident angle onto the front surface) of the light L propagating through the light guide plate 2, such as by forming fine steps, unevenness or lenticles on the rear side of the light guide plate 2 or dot-printing the rear side with white pigments using known techniques. In addition, in consideration of production costs of the light guide plate 2 and efficiency of the light emitted from the light guide plate 2, it is preferable to form fine shapes to change the propagation angle of the propagating light on the rear side of the light guide plate 2. The fine shapes are sufficient if they have inclination planes to change the propagation angle of the light propagating through the light guide plate and may be implemented with features such as steps, unevenness, lenticles and so on.

The light L incident into the light guide plate 2 through the end surface 21 propagates principally in the y-axis direction while being totally reflected from the front surface 22 and the rear side. At this time, when the light L is reflected from the light extraction structure 23, a propagation angle β of the light L (an incident angle of the light L onto the front surface 22) after being reflected is smaller than a propagation angle of the light L before being reflected. In addition, at this time, if the propagation angle β is smaller than a critical angle, that is, a minimum angle to satisfy a total reflection condition, some of the light L (light L1) is refracted at the front surface 22 and is emitted at an output angle α from the light guide plate 2, whereas the remaining light is reflected from the front surface 22 and stays within the light guide plate 2. In addition, the light reflected from the front surface 22 is incident onto the rear side. At this time, the light L1 emitted from the light guide plate 2 has a p-polarized light component and an s-polarized light component. A linearly polarized light component including a vibration direction of an electric vector of the light in a plane including a perpendicular line of the front surface 22 in the light guide plate 2 and the propagation direction of the light L1 is defined as the p-polarized light component and a linearly polarized light component whose electric vector vibration direction is perpendicular to that of the p-polarized light component is defined as the s-polarized light component. That is, in FIG. 3, a bidirectional arrow of a thick solid line indicated in the light L1 represents the electric vector vibration direction of the p-polarized light component, whereas a circle indication containing a black spot represents the electric vector vibration direction of the s-polarized light component.

Incidentally, the light guide plate 2 in the illuminating device of the first embodiment has Configuration 2 as described earlier. That is, a polarization state converting structure to convert the polarization state of the light propagating within the light guide plate is provided in the rear side of the light guide plate 2. In the first embodiment, a polarization state converting structure 25 is provided in an area 24 of the rear side in the light guide plate, in which the light extraction structure 23 is not provided. A detailed structure of the polarization state converting structure 25 will be described later.

In other words, when the light reflected from the front surface 22 is incident onto the area 24 of the rear side, as shown in FIG. 3, some or all of the light is reflected from the area 24 with its polarization state changed by the polarization state converting structure 25. Then, when the light reflected from the area 24 of the rear side is again incident onto the front surface 22, some of the light is refracted at the front surface 22 and is emitted at the output angle α from the light guide plate 2, whereas the remaining light is reflected from the front surface 22 and stays within the light guide plate 2. Effects of the polarization state converting structure 25 provided in the area 24 of the rear side in this manner will be described later.

Figure 4:
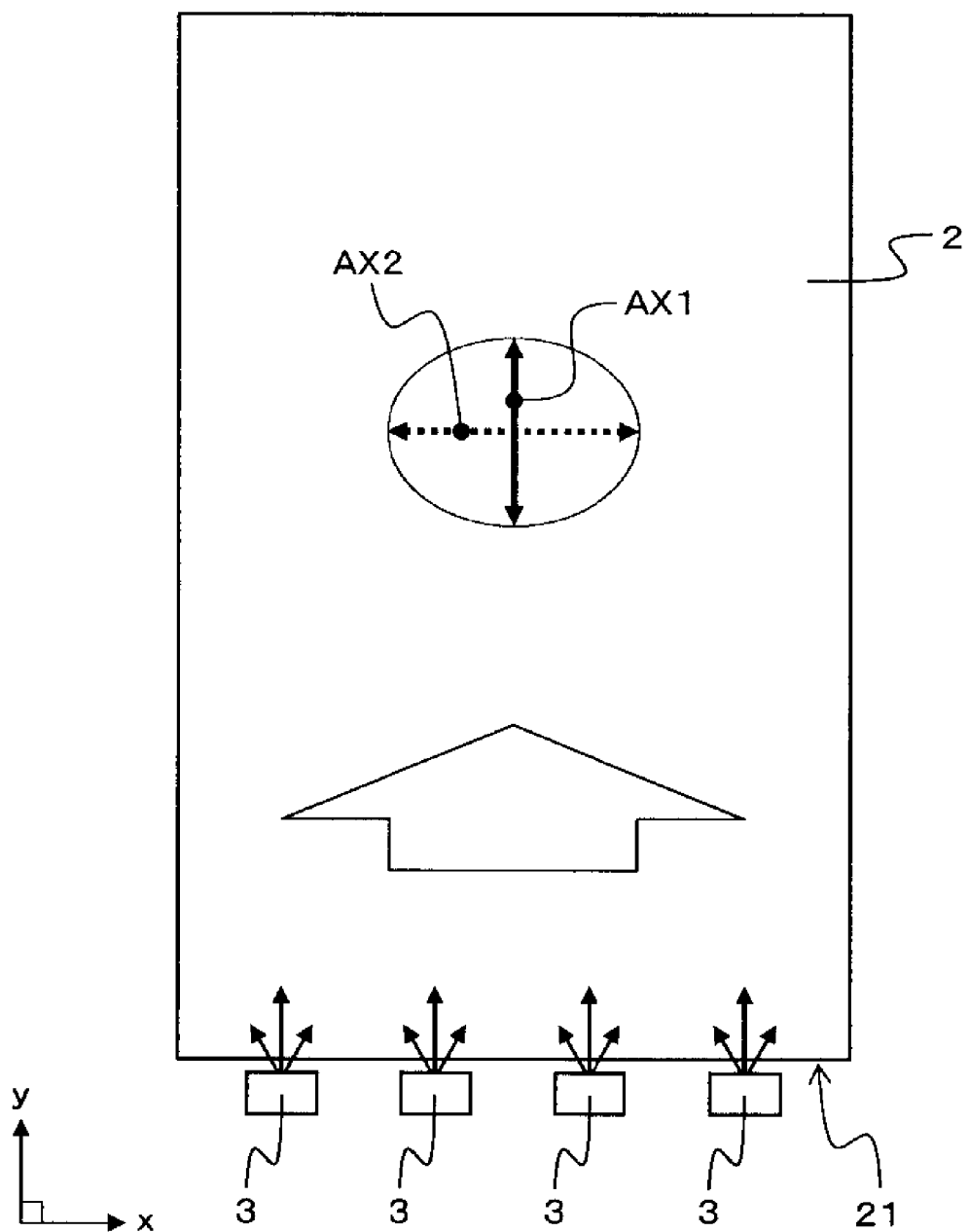
FIG. 4 is a schematic plan view for explaining a refractive index of the light guide plate in the illuminating device according to the first embodiment.

FIG. 4 is a schematic plan view for explaining a refractive index of the light guide plate in the illuminating device according to the first embodiment.

In FIG. 4, a length of a bidirectional arrow AX1 (fast axis) of a solid line and a length of a bidirectional arrow AX2 (slow axis) of a dotted line represent a magnitude relationship between refractive indexes in the arrow directions.

It is preferable that the light guide plate 2 in the illuminating device of the first embodiment has one or both of Configuration 4 and Configuration 5 as described earlier. Thus, the first embodiment will be described with Configuration 4, i.e., the birefringent light guide plate.

The light guide plate 2 in the illuminating device of the first embodiment is transparent to visible light and has birefringence and may be made of, for example, polyethylene terephthalate resin, polycarbonate resin, cyclic olefin resin, acrylic resin or the like. For example, the birefringent light guide plate 2 can be implemented by taking uniaxially stretched transparent resin as a base material and transcribing the light extraction structure 23 to emit the light L propagating in the light guide plate 2 through the front surface 22 onto the front surface 22 or the rear side. In addition, if the light guide plate 2 is formed by injection molding, birefringence may be given to the light guide plate 2, for example by using an internal residual stress occurring depending on a resin flowing direction. In addition, birefringence may be given to the light guide plate 2 by attaching a retardation film to the front surface 22 or the rear side of an optically isotropic light guide plate 2 which is made of acrylic resin or the like.

The birefringence of the light guide plate 2 may be uniaxial birefringence within a plane when observing at least the light guide plate 2 from above the front surface 22 and its conditions may be defined by direction (azimuth angle θ) of a fast axis (an axis having a lower refractive index) and a slow axis (an axis having a higher refractive index).

In the specification, as shown in FIG. 2, the azimuth angle θ is defined by assuming the short side direction (x-axis direction) of the light guide plate 2 to be 0 degrees and assuming a counterclockwise direction to be positive when observing the illuminating device 1 in plane from the top above the front surface 22 of the light guide plate 2. In this case, it is preferable that the direction of the fast axis AX1 in the light guide plate 2 is assumed to be the long side direction of the light guide plate 2, i.e., the azimuth angle θ is assumed to be 90°, as shown in FIG. 4, the reason of which will be described later. That is, it is preferable that the direction of the fast axis AX1 is substantially in parallel to the principal propagation direction in which the light L emitted from the light sources 3 and incident into the light guide plate 2 propagates through the light guide plate 2. In other words, it is preferable that the direction of the slow axis AX2 of the light guide plate 2 is assumed to be the longitudinal direction of the end surface 21 of the light guide plate 2 in which the light sources 3 are arranged (the short side direction of the light guide plate 2), i.e., the azimuth angle θ is assumed to be 0°.

In addition, the light L emitted from the light sources 3 and incident into the light guide plate 2 also contains components whose propagation direction is not in parallel to the y-axis direction, as shown in FIG. 4. However, all of these components propagate from one of the two short sides of the light guide plate 2, which is adjacent to the light sources 3, to the other. That is, in the specification, the principal propagation direction of the light propagating through the light guide plate 2 corresponds to the long side direction (y-axis direction) of the light guide plate 2.

In addition, in the light guide plate 2, a refractive index in a thickness direction may be different from a refractive index in an in-plane direction. That is, the birefringence of the light guide plate 2 in the illuminating device 1 of the first embodiment may be biaxial anisotropy.

Figure 5:
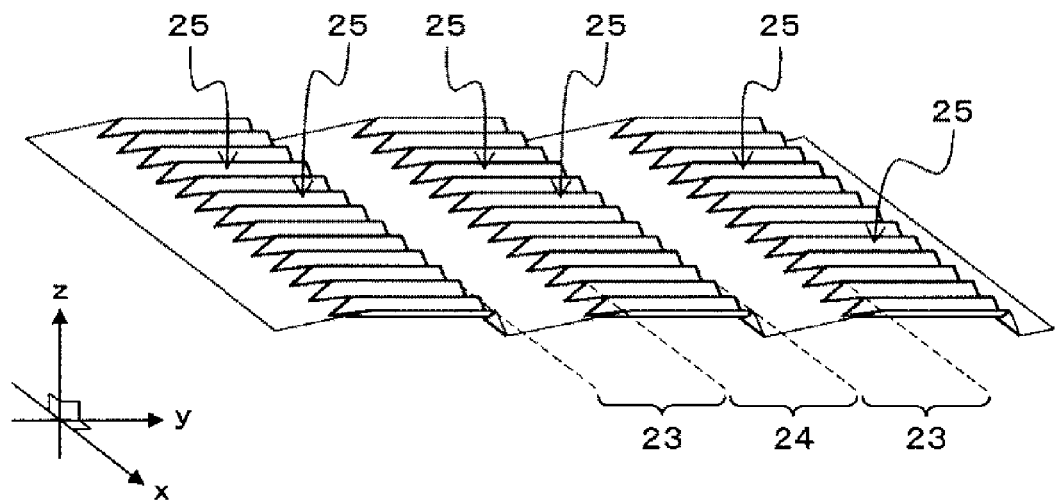
FIG. 5 is a schematic perspective view showing an example of a shape of a rear side of the light guide plate in the illuminating device according to the first embodiment.

FIG. 5 is a schematic perspective view showing an example of a shape of the rear side of the light guide plate in the illuminating device according to the first embodiment.

As described above, in the light guide plate 2, a plurality of light extraction structures 23 to emit the propagating light L through the front surface 22 is arranged on the rear side. In the first embodiment, one example of the light extraction structures 23 may be a V-like structure. In this case, each of the light extraction structures 23 has two inclination planes and a ridge line extends in a direction in which the azimuth angle θ is 0°.

In addition, while the area 24 lying between two adjacent light extraction structures 23 is commonly flat in existing light guide plates, the polarization state converting structure 25 is provided in the area 24 of the rear side in the first embodiment, as shown in FIG. 5. Specifically, the polarization state converting structure 25 contains a plurality of V-like structures, each of which has a ridge line extending in a direction perpendicular to the longitudinal direction of the end surface 21 of the light guide plate 2 in which the light sources 3 are arranged (the short side direction of the light guide plate 2), i.e., a direction in which the azimuth angle θ is 90°. Details of the polarization state converting structure 25 will be described later.

Figure 6:
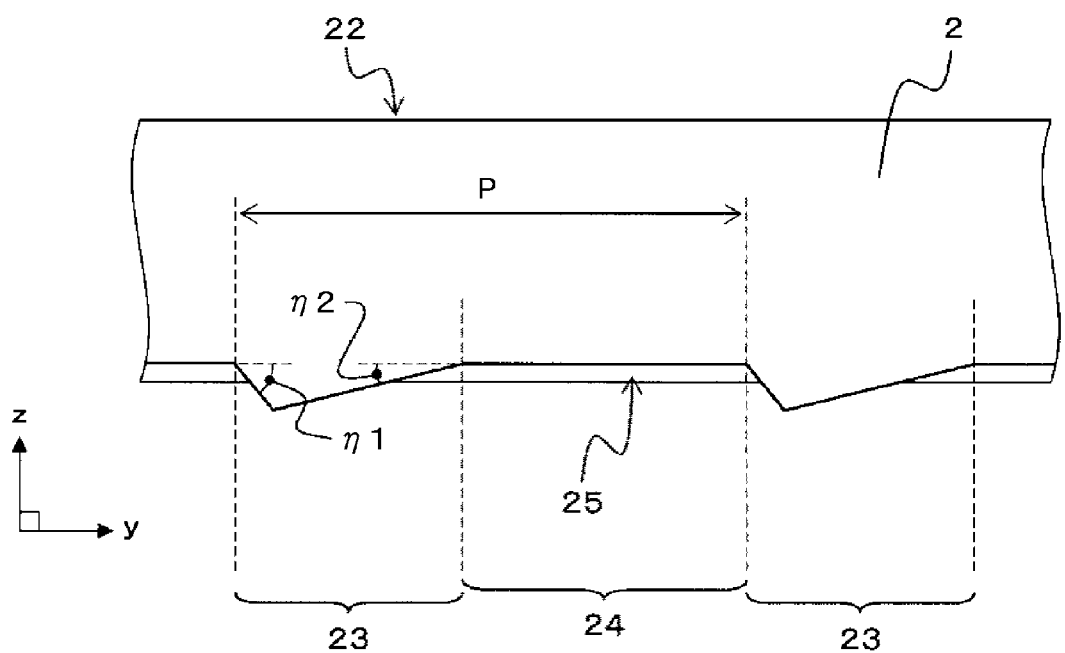
FIG. 6 is a schematic side sectional view for explaining a shape of a light extraction structure of the light guide plate.

FIG. 6 is a schematic side sectional view for explaining a shape of the light extraction structure of the light guide plate.

FIG. 6 shows a sectional configuration viewed from a section in parallel to a yz plane in an xyz coordinate system shown in FIG. 1, that is, a section in parallel to the principal propagation direction of the light propagating through the light guide plate 2, and a configuration viewed in the depth direction of the section.

The light extraction structure 23 provided in the rear side of the light guide plate 2 contains, for example, two inclination planes as shown in FIG. 6. In this case, the light sources 3 are arranged in the left side of the light guide plate 2, and an angle η1 of one of the two inclination planes, which is closer to the light sources 3, is different from and larger than an angle η2 of the other which is farther from the light sources 3. These inclination plane angles η1 and η2 are inclination angles with respect to a plane in parallel to the front surface of the light guide plate 2.

The light guide plate 2 in the illuminating device 1 of the first embodiment has Configuration 1 as described earlier, i.e., is configured such that an indicator (for example, luminance or luminous intensity) regarding the amount of the light emitted through the front surface 22 has a maximum value in a direction in which the output angle α of the light is 65° to 85° at the azimuth angle θ of about 90°.

The light guide plate 2 in which the indicator of the light emitted through the front surface 22 of the light guide plate 2 has the maximum value in the direction in which the azimuth angle θ is 90° and the output angle α is 65° to 85° may be realized, for example by setting the angle η2 of the one inclination plane constituting the light extraction structure 23 to 0.5° to 3° or so. In addition, the light extraction structure 23 may be formed to have a pitch P of several tens of μm to one hundred and several tens of μm. In addition, the angle η1 of the other inclination plane contained in the light extraction structure 23 may be selected such that loss of the light propagating through the light guide plate 2 decreases, and specifically may be selected in a range of 70° to 90°.

If an output angle α of light of the light emitted from the light guide plate 2, which gives the maximum luminance or luminous intensity, is inclined with respect to a perpendicular (normal) direction of the front surface 22 of the light guide plate 2, the light emitted at the output angle α has an increased percentage of p-polarized light component. In this manner, for the light L1 emitted in a direction inclined with respect to the perpendicular direction of the front surface 22 of the light guide plate 2, the increase of the p-polarized light component over the s-polarized light component is attributed to a difference in transmittance between the p polarization and the s polarization when the light is refracted at an interface between the front surface 22 of the light guide plate 2 and air, which is well known in the art. In addition, as described above, since the light L1 emitted from the light guide plate 2 exhibits the maximum luminance and luminous intensity when the azimuth angle θ of the propagation direction of the light L1 is 90°, with attention paid to light propagating in the propagation direction, unless otherwise stated in the specification, linearly polarized light including a vibration direction of an electric vector of the light in an yz plane including a perpendicular (normal) line of the front surface 22 in the light guide plate 2 and the direction of the azimuth θ of 90° is defined as the p-polarized light and linearly polarized light whose electric vector vibration direction is perpendicular to that of the p-polarized light is defined as the s-polarized light.

Assuming that the maximum luminance and minimum luminance of the light emitted from the light guide plate 2, the prism sheet 5 and so on are $I_{max}$ and $I_{min}$, respectively, when measured through an analyzer (polarizer) while rotating the analyzer, the degree of polarization ρ is expressed by the following equation 1.

$$\rho = (I_{max} - I_{min})/(I_{max} + I_{min}) \quad \text{(Equation 1)}$$

In addition, in the specification, assuming that luminance of light at the time when an absorption axis of the analyzer is perpendicular to the p-polarized light is $Ip_{max}$ and luminance of light at the time when the absorption axis is in parallel to the p-polarized light is $Ip_{min}$, a degree of polarization with respect to the p-polarized light (degree of polarization for the p-polarized light) $\rho_p$ is defined by the following equation 2.

$$\rho_p = (Ip_{max} - Ip_{min})/(Ip_{max} + Ip_{min}) \quad \text{(Equation 2)}$$

The light guide plate 2 in the illuminating device 1 of the first embodiment is made of a birefringent material having the fast axis AX1 in the principal propagation direction of the light (the direction of the azimuth angle θ of 90°) and the slow axis AX2 in the longitudinal direction of the end surface 21 of the light guide plate 2 in which the light sources 3 are arranged (the direction of the azimuth angle θ of 0°). In the first embodiment, in the birefringent light guide plate 2, for example, a refractive index in the direction of the azimuth angle θ of 90° is 1.59 and a refractive index in the direction of the azimuth angle θ of 0° is 1.64. Such a light guide plate 2 can be implemented, for example by taking polyethylene terephthalate resin as a base material and transcribing and forming the light extraction structure 23 or the polarization state converting structure 25 onto the rear side using transparent resin.

Figure 7:
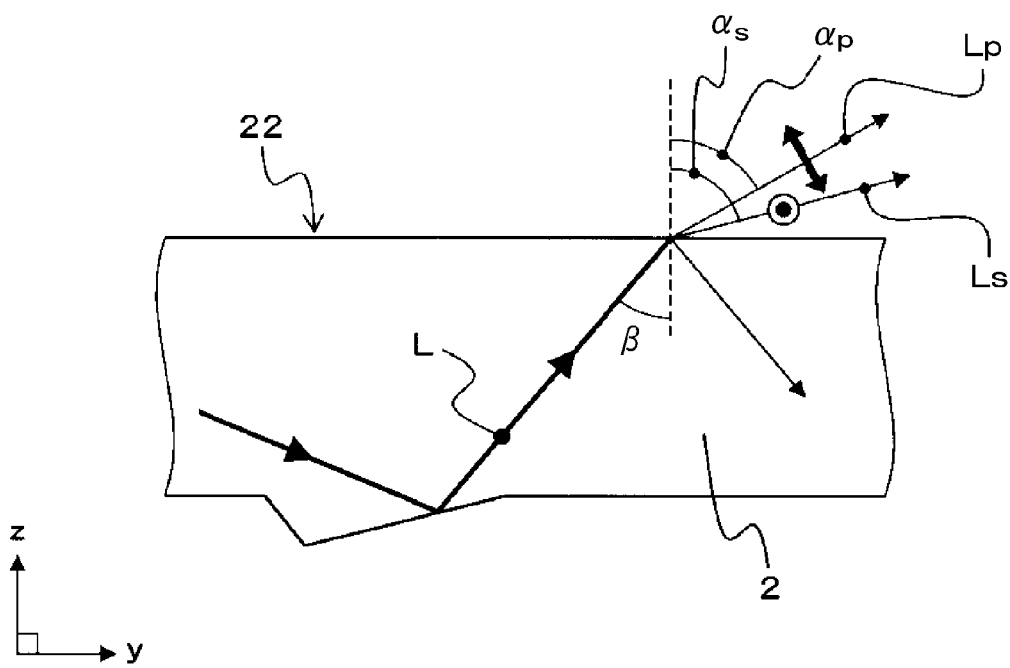
FIG. 7 is a schematic sectional view showing a relationship between a polarization component and an output angle of light emitted from a birefringent light guide plate.

FIG. 7 is a schematic sectional view showing a relationship between a polarization component and an output angle of light emitted from a birefringent light guide plate.

FIG. 7 shows a section in parallel to the yz plane in the xyz coordinate system shown in FIG. 1, that is, a section in parallel to the principal propagation direction of the light propagating through the light guide plate 2.

In the light guide plate 2 having the slow axis AX2 in the direction of the azimuth angle θ of 0°, a refractive index for the s-polarized light component in the propagating light L is high, whereas a refractive index for the p-polarized light component is low. Accordingly, the transmittance and the output angle of the light L incident from the inside of the light guide plate 2 onto the front surface 22 are different in the p-polarized light and the s-polarized light. Specifically, as shown in FIG. 7, even when the propagation angle β of the p-polarized light is equal to that of the s-polarized light, an output angle $\alpha_s$ of the s-polarized light becomes larger than an output angle $\alpha_p$ of the p-polarized light.

Figure 8:
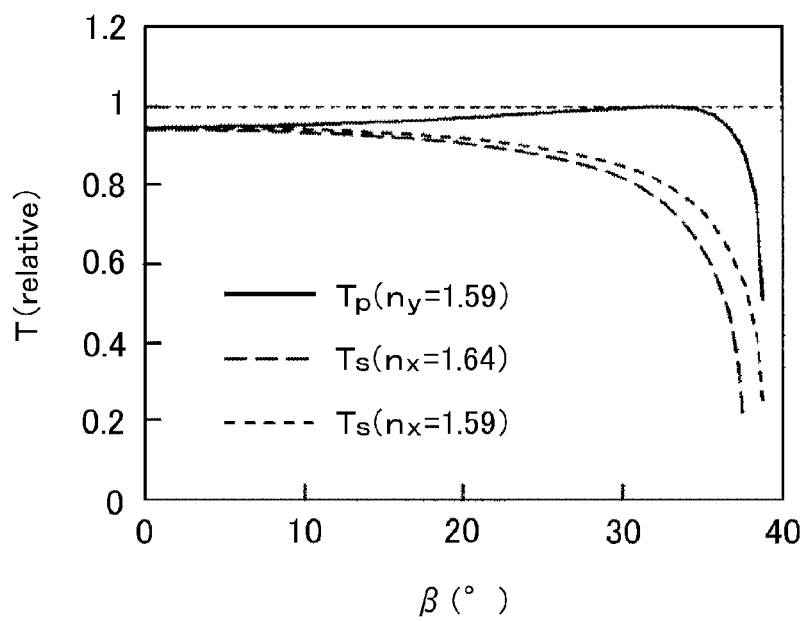
FIG. 8 is a graph showing an example of a relationship between a propagation angle of light incident from the inside onto a front surface of the light guide plate and transmittance of p-polarized light and s-polarized light.

FIG. 8 is a graph showing an example of a relationship between a propagation angle of light incident from the inside onto the front surface of the light guide plate and transmittance of p-polarized light and s-polarized light.

In the graph of FIG. 8, a horizontal axis represents a propagation angle β (degrees) of light and a vertical axis represents a transmittance T (relative value). In addition, in the graph of FIG. 8, $T_p$ and $T_s$ represent transmittances of p-polarized light and s-polarized light, respectively, and $n_x$ and $n_y$ represent refractive indexes in the direction of the azimuth angle θ of 0° and the direction of the azimuth angle θ of 90°, respectively.

As can be seen from FIG. 8, when the light L passes through an interface between the light guide plate 2 and air, if the light L is obliquely incident, there occurs a difference between the transmittance $T_p$ of the p-polarized light and the transmittance $T_s$ of the s-polarized light. In particular, when the slow axis AX2 lies in the direction of the azimuth angle θ of 0° as in the first embodiment, the transmittance $T_s$ of the s-polarized light is further reduced to expand the difference with the transmittance $T_p$ of the p-polarized light. This increases the percentage of the p-polarized light component in the light emitted through the front surface 22 of the light guide plate 2 in the illuminating device 1 of the first embodiment.

Figure 9:
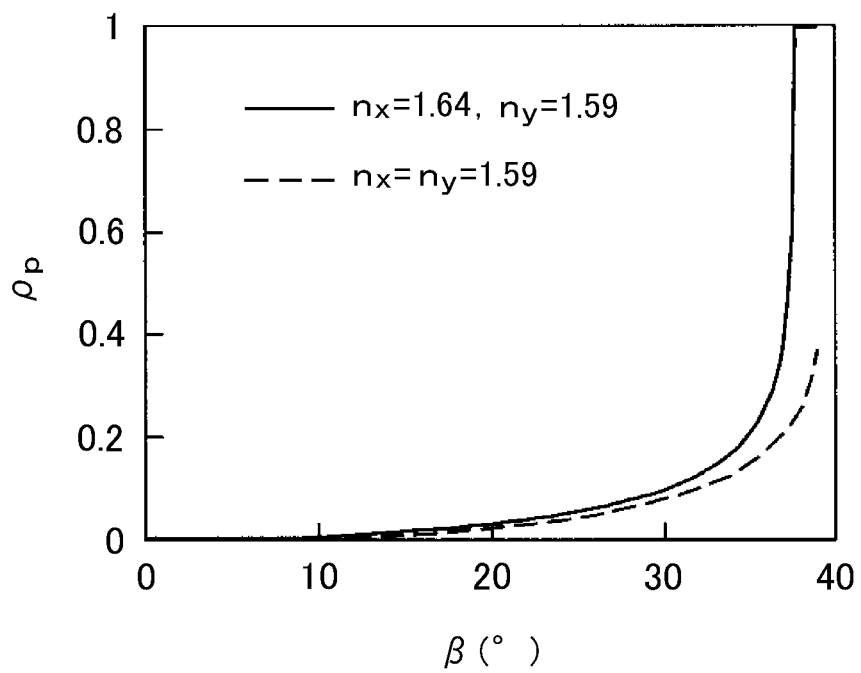
FIG. 9 is a graph showing an example of a relationship between the propagation angle of light and the degree of polarization of p-polarized light of the light emitted from the light guide plate calculated based on the relationship shown in FIG. 8.

FIG. 9 is a graph showing an example of a relationship between the propagation angle of light calculated based on the relationship shown in FIG. 8 and the degree of polarization of p-polarized light of the light emitted from the light guide plate.

In the graph of FIG. 9, a horizontal axis represents an incident angle β (degrees) of light and a vertical axis represents a degree of polarization $\rho_p$ of p-polarized light. Also, in FIG. 9, $n_x$ and $n_y$ represent refractive indexes in the direction of the azimuth angle θ of 0° and the direction of the azimuth angle θ of 90°, respectively. In addition, in FIG. 9, a solid curve represents the relationship in the birefringent light guide plate 2 used in the illuminating device 1 of the first embodiment and a dotted curve represents the relationship in a non-birefringent light guide plate.

As can be seen from FIG. 9, in the illuminating device 1 of this embodiment, the degree of polarization $\rho_p$ of p-polarized light in the light emitted through the front surface 22 of the light guide plate 2 is higher than that of the non-birefringent light guide plate used in existing general illuminating devices. In particular, in a wide range in which the propagation angle β of light (the incident angle of light onto the front surface 22) exceeds 38°, the degree of polarization $\rho_p$ of p-polarized light is 1, whereas the s-polarized light is not emitted. This is because the incident angle β of light exceeds a critical angle for a refractive index acting on the s-polarized light. That is, in the light guide plate 2 used in the illuminating device 1 of the first embodiment, the propagation angle β of light exceeds the critical angle for the s-polarized light and is smaller than the critical angle for the p-polarized light. In this range, in principle, since the light emitted from the light guide plate 2 is just the p-polarized light, the percentage of the p-polarized light component in the light emitted through the front surface 22 can be greatly increased.

Figure 10:
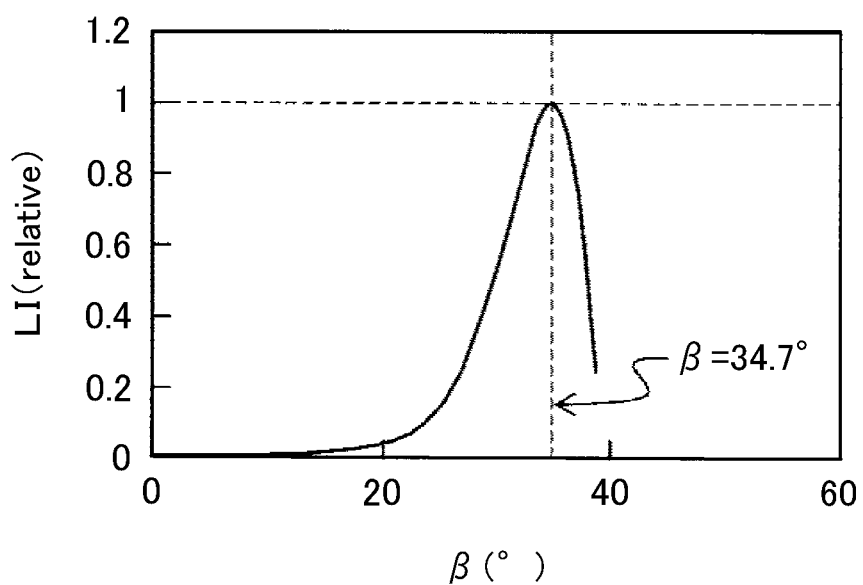
FIG. 10 is a graph showing an example of a relationship between a propagation angle and a luminous intensity of light directed from the inside to a front surface of the light guide plate.
Figure 11:
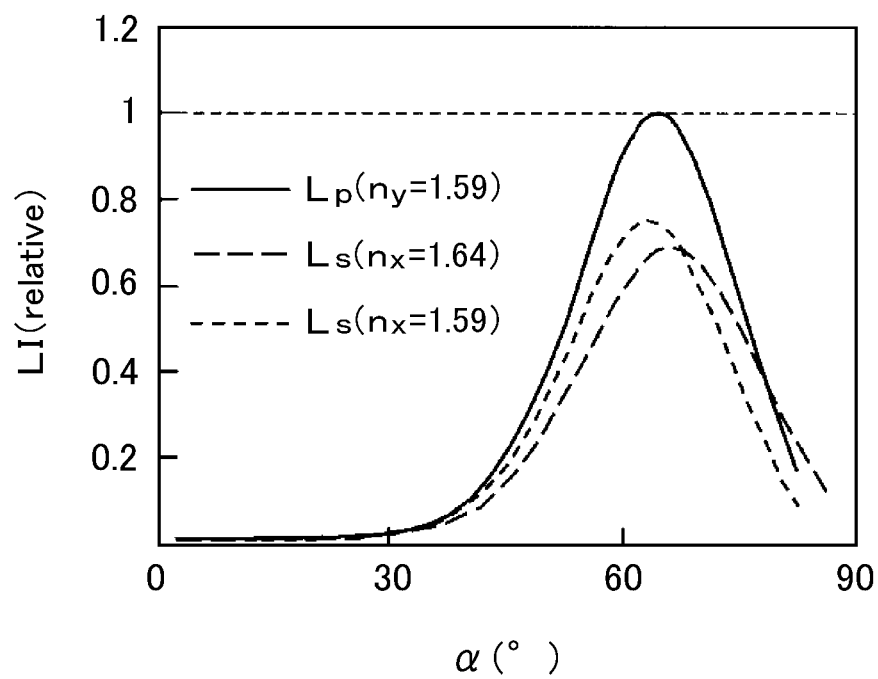
FIG. 11 is a graph showing an example of a relationship between an output angle and a luminous intensity when light having a distribution of luminous intensity shown in FIG. 10 is emitted through a front surface of the light guide plate.

FIG. 10 is a graph showing an example of a relationship between a propagation angle and a luminous intensity of light directed from the inside to the front surface of the light guide plate. FIG. 11 is a graph showing an example of a relationship between an output angle and a luminous intensity when light having a distribution of luminous intensity shown in FIG. 10 is emitted through the front surface of the light guide plate.

In the graph of FIG. 10, a horizontal axis represents a propagation angle β (degrees) of light and a vertical axis represents a luminous intensity LI (relative value). Also, in the graph of FIG. 11, a horizontal axis represents an output angle α (degrees) of light emitted through the front surface 22 of the light guide plate 2 and a vertical axis represents a luminous intensity LI (relative value). In addition, in the graph of FIG. 11, $L_p$ and $L_s$ represent p-polarized light and s-polarized light, respectively, and $n_x$ and $n_y$ represent refractive indexes in the direction of the azimuth angle θ of 0° and the direction of the azimuth angle θ of 90°, respectively. Further, in the graph of FIG. 11, a short dotted curve represents a relationship between the output angle α of the s-polarized light $L_s$ and the luminous intensity LI in an existing non-birefringent light guide plate as a comparative example.

When the light guide plate 2 having the characteristics shown in FIG. 10 is used, the propagation angle β of light (the incident angle of light onto the front surface 22) providing the maximum of the luminous intensity LI is 34.7°. In this case, relationships between the output angle α and the luminous intensity LI of the p-polarized light $L_p$ and the s-polarized light $L_s$ emitted from the light guide plate 2 are as shown in a solid curve and a long dotted curve shown in FIG. 11, respectively. That is, in a birefringent light guide plate 2 having a slow axis in the direction of the azimuth angle of 0°, such as the light guide plate 2 used in the illuminating device 1 of the first embodiment, the maximum value of the luminous intensity LI of the s-polarized light $L_s$ emitted through the front surface 22 is decreased and its peak angle is increased. Accordingly, in the light guide plate 2 used in the illuminating device 1 of the first embodiment, light having a greater p-polarized light component can be emitted at the output angle α of light providing the peak luminous intensity of the p-polarized light $L_p$ or below.

Figure 12:
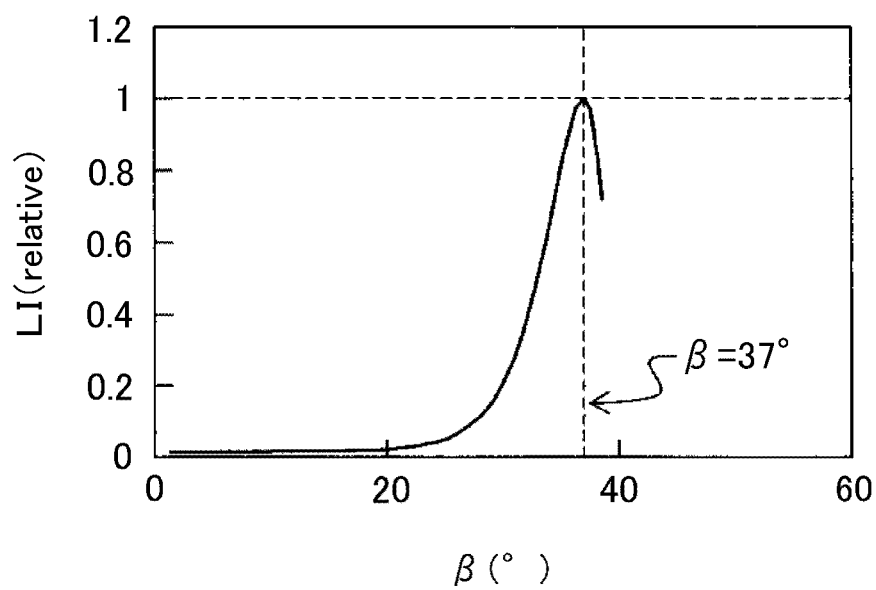
FIG. 12 is a graph showing an example of a relationship between a propagation angle and a luminous intensity of light directed from the inside to a front surface of the light guide plate.
Figure 13:
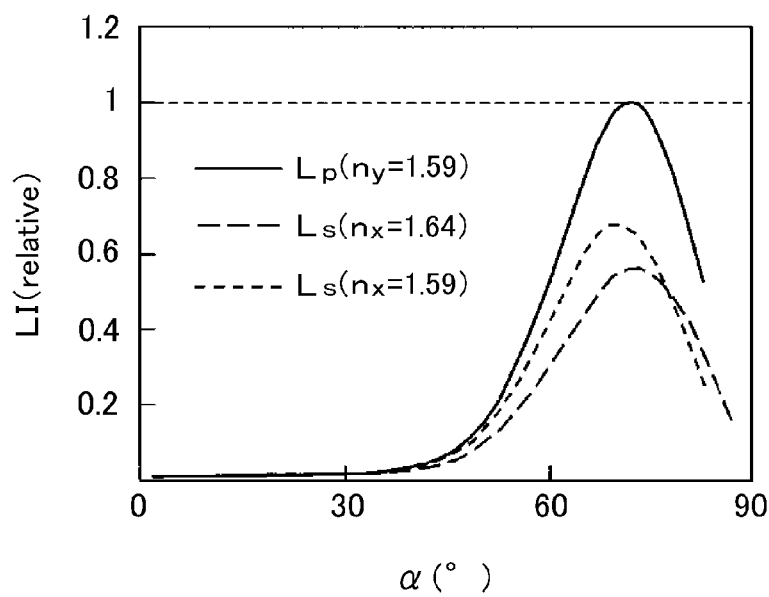
FIG. 13 is a graph showing an example of a relationship between an output angle and a luminous intensity when light having a distribution of luminous intensity shown in FIG. 12 is emitted from a front surface of the light guide plate.

FIG. 12 is a graph showing another example of the relationship between the propagation angle and the luminous intensity of light directed from the inside to the front surface of the light guide plate. FIG. 13 is a graph showing an example of a relationship between an output angle and a luminous intensity when light having a distribution of luminous intensity shown in FIG. 12 is emitted through the front surface of the light guide plate.

In the graph of FIG. 12, a horizontal axis represents a propagation angle β (degrees) of light and a vertical axis represents a luminous intensity LI (relative value). Also, in the graph of FIG. 13, a horizontal axis represents an output angle α (degrees) of light emitted through the front surface 22 of the light guide plate 2 and a vertical axis represents a luminous intensity LI (relative value). In addition, in the graph of FIG. 13, $L_p$ and $L_s$ represent p-polarized light and s-polarized light, respectively, and $n_x$ and $n_y$ represent refractive indexes in the direction of the azimuth angle θ of 0° and the direction of the azimuth angle θ of 90°, respectively. Further, in the graph of FIG. 13, a short dotted curve represents a relationship between the output angle α of the s-polarized light $L_s$ and the luminous intensity LI in an existing non-birefringent light guide plate as a comparative example.

In comparison with the light guide plate 2 having the characteristics shown in FIG. 10, in the light guide plate 2 having the characteristics shown in FIG. 12, the propagation angle β of light (the incident angle of light onto the front surface 22) providing the maximum of the luminous intensity LI is increased to 37°. Such a light guide plate 2 can be realized by making the inclination plane angle η2 of the light extraction structure 23 smaller, specifically setting it to be less than 2°. In this case, relationships between the output angle α and the luminous intensity LI of the p-polarized light $L_p$ and the s-polarized light $L_s$ emitted from the light guide plate 2 are as shown in a solid curve and a long dotted curve shown in FIG. 13, respectively. Accordingly, also in this case, light having a greater p-polarized light component can be emitted, particularly at the output angle α of light providing the peak luminous intensity of the p-polarized light $L_p$ or below.

Comparing FIG. 11 with FIG. 13, the light guide plate 2 of FIG. 13 in which the propagation angle β of light (the incident angle of light onto the front surface 22) providing the maximum of the luminous intensity LI is 37° has a smaller luminous intensity LI of the s-polarized light $L_s$ emitted through the front surface 22 than that of FIG. 11. Accordingly, light having a greater p-polarized component can be emitted by using a light guide plate 2 providing a higher peak of the propagation angle β of light.

As described above, by using the light guide plate 2 having the slow axis AX2 in the direction of the azimuth angle θ of 0°, i.e., a direction in parallel to the longitudinal direction of the end surface 21 of the light guide plate 2 in which the light sources 3 are arranged, a higher percentage of p-polarized light component in the light emitted through the front surface 22 of the light guide plate 2 can be emitted.

On the other hand, light reflected from the front surface 22 of the light guide plate 2 into the inside of the light guide plate 2 has a high percentage of s-polarized light component. Thus, in order to further increase the percentage of the p-polarized light component in the light emitted from the light guide plate 2, it is believed that it is very effective to convert s-polarized light remaining in the light guide plate 2 into p-polarized light. Since the light guide plate 2 used in the illuminating device 1 of the first embodiment has Configuration 2, light reflected from the front surface 22 into the rear side of the light guide plate 2 undergoes a change in its polarization state due to an action of the polarization state converting structure 25 when the light is reflected from the rear side. Thus, it is possible to decrease a percentage of s-polarized light component in the light remaining in the light guide plate 2. That is, since the p-polarized light component in the light reflected from the rear side of the light guide plate 2 into the front surface is increased, the percentage of the p-polarized light component in the light emitted through the front surface 22 is increased. Accordingly, it is possible to realize a light guide plate 2 to emit light having a higher percentage of p-polarized light component.

Next, a structure of the rear side of the light guide plate 2 including the polarization state converting structure 25 will be described in detail.

Figure 14:
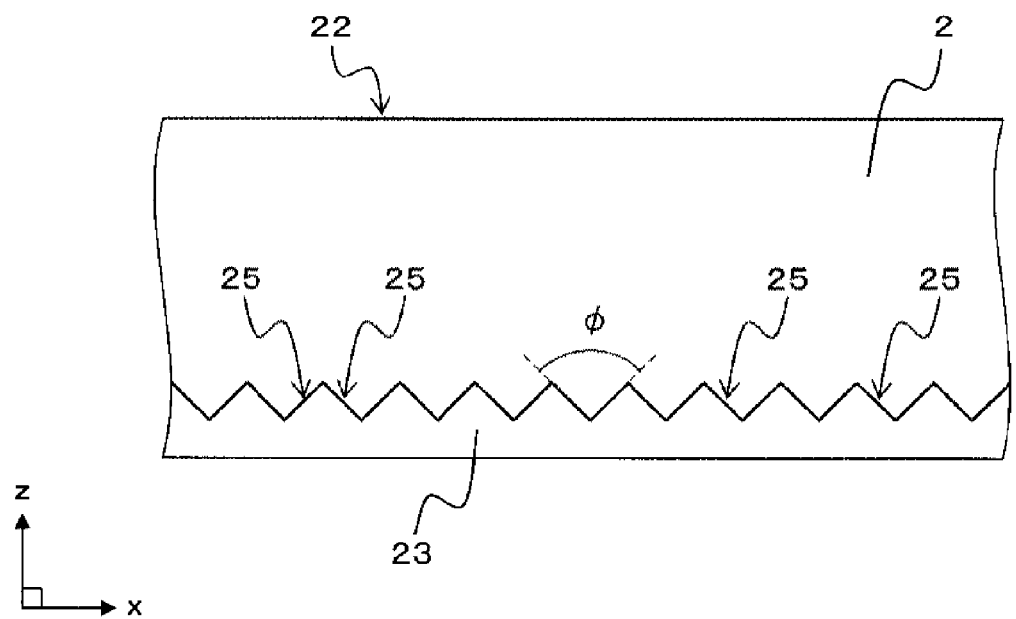
FIG. 14 is a schematic sectional view showing an example of a sectional configuration of an area where a polarization state converting structure is provided.
Figure 15:
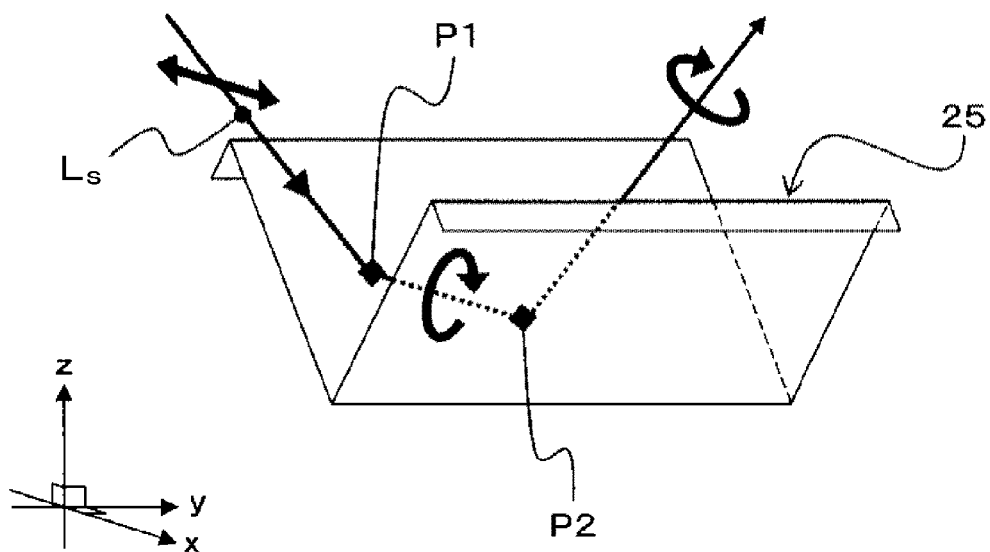
FIG. 15 is a schematic view showing a change of polarization state of light by the polarization state converting structure.

FIGS. 14 and 15 are schematic views for explaining an example of the polarization state converting structure provided in the light guide plate.

FIG. 14 is a schematic sectional view showing an example of a sectional configuration of an area where the polarization state converting structure is provided. FIG. 15 is a schematic view showing a change of polarization state of light by the polarization state converting structure.

In addition, FIG. 14 shows a sectional configuration viewed from a section in parallel to the xz plane in the xyz coordinate system shown in FIG. 1, that is, a section in parallel to the longitudinal direction of the end surface 21 of the light guide plate 2 in which the light sources 3 are arranged, and a configuration viewed in the depth direction of the section.

The polarization state converting structure 25 in the light guide plate 2 used in the illuminating device 1 of the first embodiment has, for example, a V-like section as shown in FIG. 14. Here, an angle between facing inclination planes to form a V-like structure is defined as an apex angle φ. For example, if the apex angle φ is set to 90°, when light propagating through the light guide plate 2 in the direction of the azimuth angle θ of 90° is incident at a propagation angle β with respect to the polarization state converting structure 25, the light is reflected at a reflection angle equal to β, just as it is incident onto a flat surface.

In addition, the light incident into the polarization state converting structure 25 is reflected from two inclination planes. At this time, for example, as shown in FIG. 15, if s-polarized light $L_s$ (s-polarized light defined in the narrow sense in the specification) is incident into the polarization state converting structure 25, since the inclination planes included in the polarization state converting structure 25 is oblique with respect to a polarization axis of the incident light, a polarization state of the light is changed when the light is reflected from a point P1 on any inclination plane. Further, the polarization state is changed also when the light is reflected from a point P2 of an adjacent inclination plane. In this manner, the polarization state of the light incident into the polarization state converting structure 25 is converted.

Figure 16:
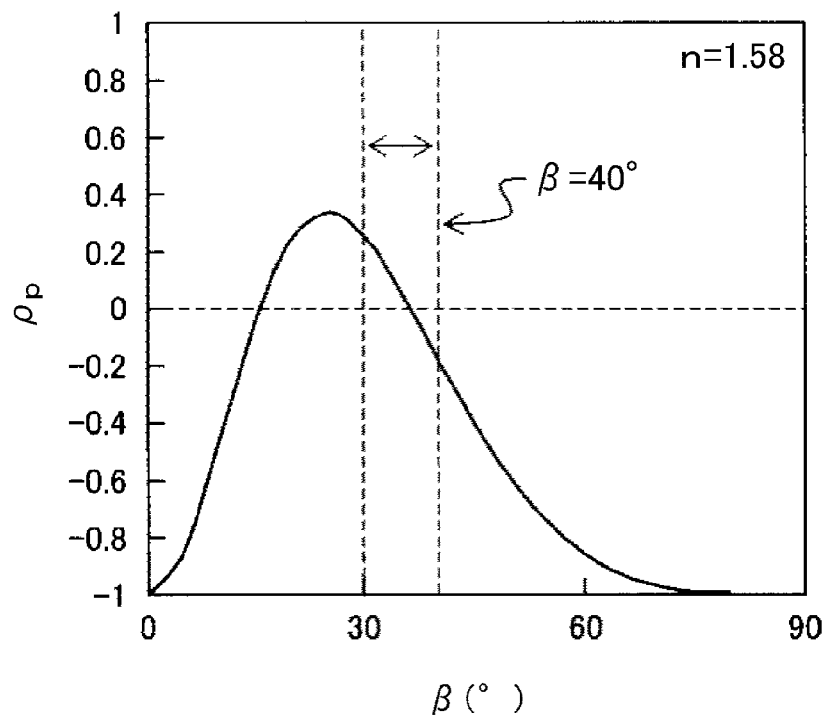
FIG. 16 is a graph showing an example of a relationship between a propagation angle of s-polarized light and a degree of polarization of p-polarized light of reflection light when the s-polarized light is reflected from the polarization state converting structure.
Figure 17:
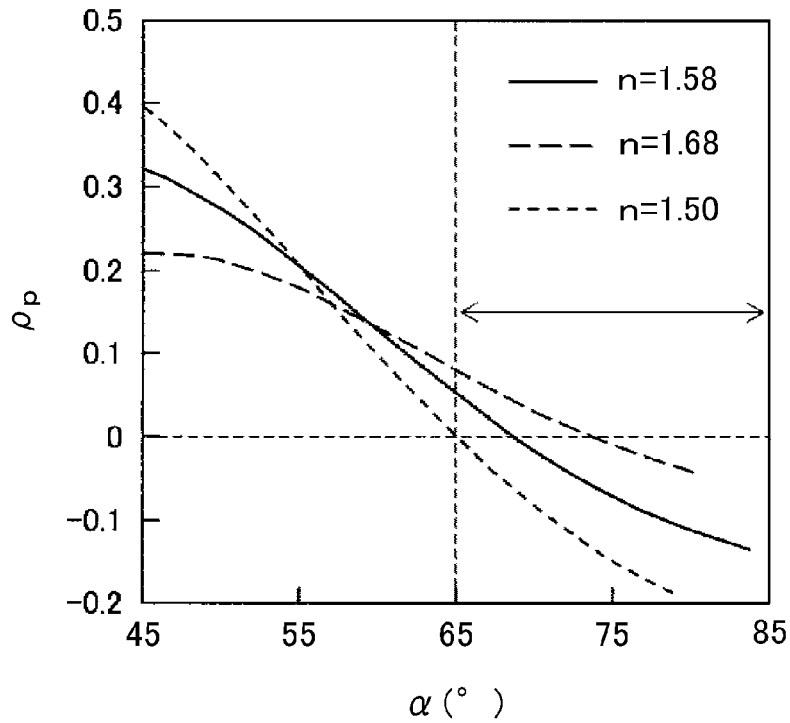
FIG. 17 is a graph showing an example of a relationship between an output angle and a degree of polarization of p-polarized light when s-polarized light is emitted through a front surface of the light guide plate after being reflected from the polarization state converting structure.

FIG. 16 is a graph showing an example of a relationship between a propagation angle of s-polarized light and a degree of polarization of p-polarized light of reflection light when the s-polarized light is reflected from the polarization state converting structure. FIG. 17 is a graph showing an example of a relationship between an output angle and a degree of polarization of p-polarized light when s-polarized light is emitted through the front surface of the light guide plate after being reflected from the polarization state converting structure.

In the graph of FIG. 16, a horizontal axis represents a propagation angle $\beta$ (degrees) of s-polarized light and a vertical axis represents a degree of polarization $\rho_p$ of p-polarized light. Also, in the graph of FIG. 17, a horizontal axis represents an output angle $\alpha$ (degrees) of light and a vertical axis represents a degree of polarization $\rho_p$ of p-polarized light.

Assuming that an apex angle $\phi$ of the polarization state converting structure 25 is 90° and a refractive index n of the polarization state converting structure 25 is 1.58, the degree of polarization $\rho_p$ of p-polarized light in the reflection light when the s-polarized light propagating at the propagation angle $\beta$ in the direction of the azimuth angle $\theta$ of 90° is reflected from the polarization state converting structure 25 was calculated. A result of the calculation is as shown in FIG. 16. That is, when the s-polarized light is incident into the polarization state converting structure 25, the percentage of s-polarized light can be approximately halved in a range of the propagation angle $\beta$ of from 30° to 40° which is actually used. In this manner, light having a higher percentage of s-polarized light component reflected from the front surface 22 of the light guide plate 2 undergoes a change of its polarization state due to the polarization state converting structure 25 provided in the rear side of the light guide plate 2, and thus a percentage of s-polarized light component is decreased. Accordingly, light incident onto the front surface 22 of the light guide plate again is emitted as light having a higher percentage of p-polarized light component.

In addition, in the case of the emitted light which is occurred from the s-polarized light propagated at the propagation angle $\beta$ in the direction of the azimuth angle $\theta$ of 90°, reflected from the polarization state converting structure 25, and emitted through the front surface 22 of the light guide plate, a relationship between the output angle $\alpha$ of the emitted light and the degree of polarization $\rho_p$ of p-polarized light of the emitted light was calculated. A result of the calculation is as shown in FIG. 17. FIG. 17 shows a relationship between the output angle $\alpha$ and the degree of polarization $\rho_p$ of p-polarized light when the apex angle $\phi$ of the polarization state converting structure 25 is set to 90° and a refractive index n of the light guide plate including the polarization state converting structure 25 is set to 1.50, 1.58 and 1.68.

As can be seen from FIG. 17, in an angle range (a range of the output angle $\alpha$ from 65° to 85°) providing the maximum of an indicator (for example, luminance or luminous intensity) regarding the amount of the light emitted from the light guide plate 2, a higher refractive index n provides a higher degree of polarization $\rho_p$ of p-polarized light and better polarization conversion efficiency. Accordingly, it is preferable to increase the refractive index n of the light guide plate including the polarization state converting structure 25.

In addition, particularly if the polarization state converting structure 25 is made of a material different from the base material of the light guide plate 2, it is preferable to set the refractive index of the polarization state converting structure 25 to be equal or substantially equal to the refractive index of the light guide plate 2 in the direction of the azimuth angle $\theta$ of 0°. In this case, there is no or little difference between the refractive index of the base material of the light guide plate 2 and the refractive index of the polarization state converting structure 25 for the s-polarized light component. Therefore, reflection of the s-polarized light component at an interface between the base material of the light guide plate 2 and the polarization state converting structure 25 is suppressed, efficient action of the polarization state converting structure 25 is achieved.

Further, if the polarization state converting structure 25 is made of a material different from the base material of the light guide plate 2, the polarization state converting structure 25 can be realized by transcribing transparent resin onto the base material of the light guide plate 2 using, for example, a metallic mold having a desired shape formed therein. An example of the transparent resin may include ultraviolet curable resin or the like but material for the polarization state converting structure 25 of the present invention is not limited to the ultraviolet curable resin.

Figure 18:
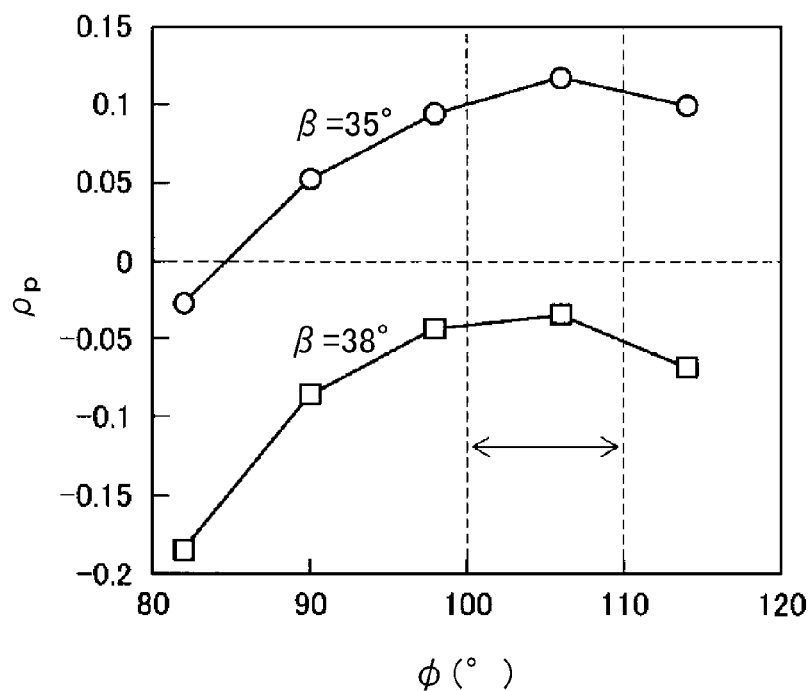
FIG. 18 is a graph showing an example of a relationship between an apex angle of the polarization state converting structure and a degree of polarization of p-polarized light for reflection light when s-polarized light is incident into the polarization state converting structure.

FIG. 18 is a graph showing an example of a relationship between an apex angle of the polarization state converting structure and a degree of polarization of p-polarized light for reflection light when s-polarized light is incident into the polarization state converting structure.

In the graph of FIG. 18, a horizontal axis represents an apex angle $\phi$ (degrees) of inclination planes included in the polarization state converting structure and a vertical axis represents a degree of polarization $\rho_p$ of p-polarized light. Also, the graph of FIG. 18 shows a relationship between the apex angle $\phi$ and the degree of polarization $\rho_p$ of p-polarized light when the propagation angle $\beta$ of the s-polarized light is 35° and 38°. Depending on a refractive index of the light guide plate 2 in the strict sense, a range of the propagation angle $\beta$ from 35° to 38° generally corresponds to a range of the output angle $\alpha$ from 65° to 85° providing the maximum of an indicator (for example, luminance or luminous intensity) regarding the amount of the light emitted from the light guide plate 2.

The polarization state converting structure 25 works with provision of inclination planes in a direction of a ridge line corresponding to the direction of the azimuth angle $\theta$ of 90°. Accordingly, when the polarization state converting structure 25 is a V-like structure, a polarization state can be changed if its apex angle $\phi$ is less than 180°. However, in order to obtain a meaningful effect, it is preferable to set the apex angle $\phi$ to fall within a range of 80° to 130°. In addition, the examination of the relationship between the apex angle $\phi$ of the polarization state converting structure 25 and the degree of polarization $\rho_p$ of p-polarized light showed that the apex angle $\phi$ between 100° and 110° provides the maximum degree of polarization $\rho_p$ of p-polarized light when the propagation angle $\beta$ is 35° and 38°, as shown in FIG. 18. Accordingly, it is preferable that the apex angle $\phi$ of the polarization state converting structure 25 is selected from a range of 100° to 110° from a standpoint of polarization conversion efficiency.

To make the V-like structure act as the polarization state converting structure 25, it is required to set a pitch of the V-like structure to be larger than a wavelength of visible light, practically to be several μm to several hundred μm. In addition, if an illumination target of the illuminating device 1 is a liquid crystal display panel, it is preferable to select a pitch at which moiré does not easily occur from a relation with a pixel pitch of the liquid crystal display panel or employ unequal pitches in order to prevent moire from occurring.

As described above, in the illuminating device 1 of the first embodiment, by converting the polarization state of the s-polarized light included in the light reflected from the front surface 22 of the light guide plate 2 into a different polarization state using the polarization state converting structure 25, it is possible to greatly increase a percentage of p-polarized light in the light emitted from the light guide plate 2. Accordingly, it is possible to efficiently increase a degree of polarization of the light emitted from the light guide plate 2.

In addition, in the illuminating device 1 of the first embodiment, since the degree of polarization of the light emitted from the light guide plate 2 is high, for example, when the illuminating device 1 is used as a backlight of a liquid crystal display device, use efficiency of light from the backlight in the liquid crystal display device can be improved.

FIGS. 19 to 22 are schematic views for explaining several modifications of the light guide plate used in the illuminating device 1 of the first embodiment.

Figure 19:
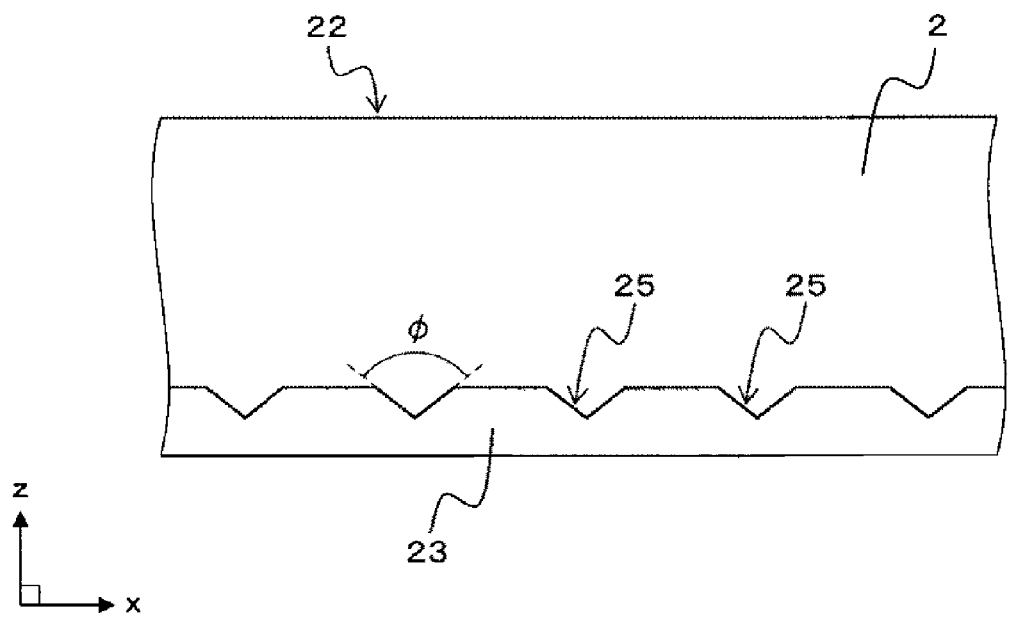
FIG. 19 is a schematic sectional view showing a first modification of the polarization state converting structure.
Figure 20:
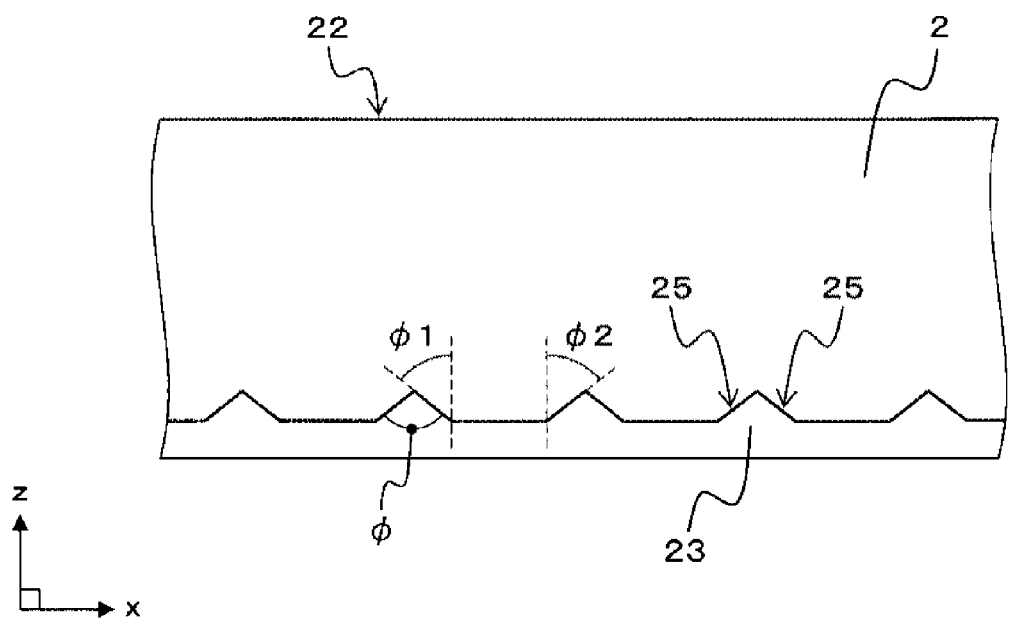
FIG. 20 is a schematic sectional view showing a second modification of the polarization state converting structure.
Figure 21:
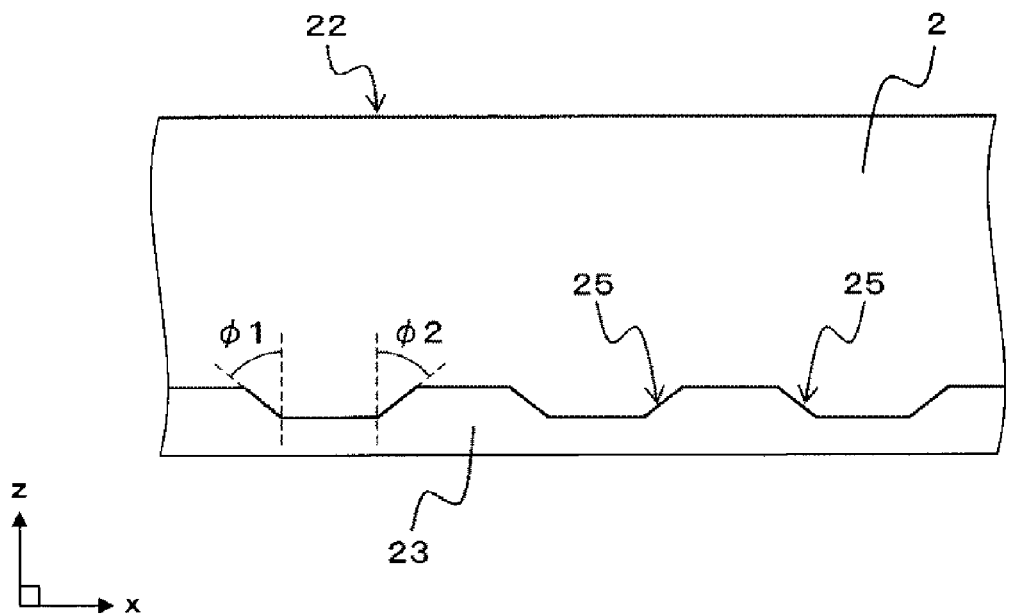
FIG. 21 is a schematic sectional view showing a third modification of the polarization state converting structure.
Figure 22:
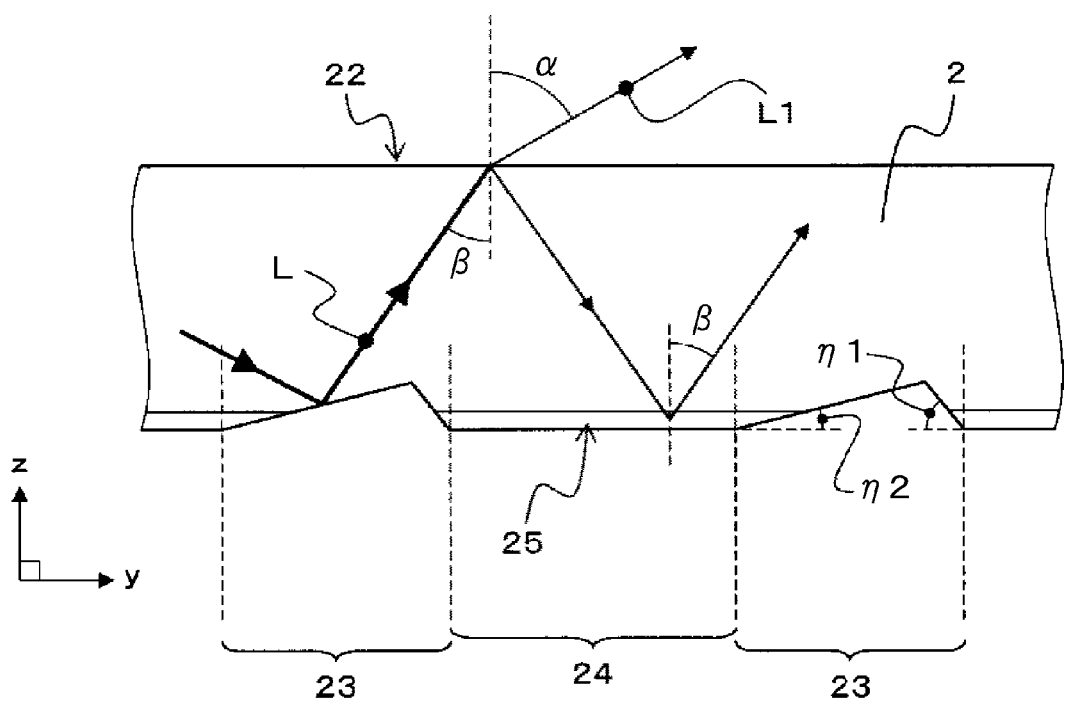
FIG. 22 is a schematic sectional view showing a modification of the light extraction structure.

FIG. 19 is a schematic sectional view showing a first modification of the polarization state converting structure, FIG. 20 is a schematic sectional view showing a second modification of the polarization state converting structure, FIG. 21 is a schematic sectional view showing a third modification of the polarization state converting structure, and FIG. 22 is a schematic sectional view showing a modification of the light extraction structure.

FIGS. 19, 20 and 21 show a sectional configuration viewed from a section in parallel to an xz plane in the xyz coordinate system shown in FIG. 1, that is, a section in parallel to the longitudinal direction of the end surface 21 of the light guide plate 2 in which the light sources 3 are arranged, and a configuration viewed in the depth direction of the section. In addition, FIG. 22 shows a sectional configuration viewed from a section in parallel to a yz plane in the xyz coordinate system shown in FIG. 1, that is, a section in parallel to the principal propagation direction of the light propagating through the light guide plate 2, and a configuration viewed in the depth direction of the section.

An example of the polarization state converting structure 25 provided in the light guide plate 2 may include the V-like structure constituted by two inclination planes in the area 24 between adjacent light extraction structures 23 on the rear side of the light guide plate 2, as shown in FIGS. 5 and 14, for example of the first embodiment. In the example shown in FIGS. 5 and 14, the V-like structure is continuously provided throughout the area 24 between adjacent light extraction structures 23.

However, the polarization state converting structure 25 is not limited to the above-configured V-like structure. For example, as shown in FIG. 19, polarization state converting structures 25 may be intermittently arranged in the area 24 between adjacent light extraction structures 23 in the rear side of the light guide plate 2, with flat portions provided between adjacent polarization state converting structures 25.

In addition, the polarization state converting structure 25 is not limited to the V-like structure. For example, as shown in FIG. 20, the polarization state converting structure 25 may be a structure containing a flat portion provided between two inclination planes in a pair for conversion of a polarization state. In addition, for example, as shown in FIG. 21, the polarization state converting structure 25 may be a structure containing a flat portion provided between two inclination planes in a pair for conversion of a polarization state as well as between adjacent polarization state converting structures 25.

All of the above structures have the ability to convert a polarization state and the optimal one may be selected in terms of optics design or in a process of metallic molding or light guide plate forming. That is, since the polarization state converting structure 25 provided in the rear side of the light guide plate 2 works with provision of an inclination plane having a ridge line in the direction of the azimuth angle θ of 90°, the optimal one of the various possible structures may be selected depending on the use thereof.

In addition, for the polarization state converting structure 25 as shown in FIGS. 20 and 21, angles φ1 and φ2 formed between the respective inclination planes and the flat portion may be set to be half of the apex angle φ described with reference to FIG. 14. Specifically, if the angles φ1 and φ2 are less than 90°, a polarization state can be changed; however, to obtain a meaningful effect, it is preferable that the angles φ1 and φ2 are equal to or more than 40° and equal to or less than 65°. In order to obtain higher polarization conversion efficiency, it is preferable that the angles φ1 and φ2 are equal to or more than 50° and equal to or less than 55°.

It is believed that the parallelism of the direction of the ridge line of the inclination plane to the direction of the azimuth angle θ of 90°, i.e., the principal propagation direction of the light propagating through the light guide plate is desirable for realization of the ability to convert a polarization state and preparing a metallic molding for formation of a polarization state converting structure, although not limited thereto. That is, since a polarization state is changed when the direction of the ridge line of the inclination plane is a direction other than the direction of the azimuth angle θ of 0°, for example, the direction of the ridge line of the inclination planes may be deviated from the direction of the azimuth angle θ of 90° within a range of ±45° or ±20°. And the direction of the ridge line of the inclination planes may zigzag or waver within this angular range.

In addition, in the first embodiment, an example of the light extraction structure 23 provided in the rear side of the light guide plate 2 includes the V-like structure as shown in FIG. 6 and so on. For this structure, of two inclination planes included in the V-like structure, an inclination plane farther from the light sources 3 is responsible for changing the propagation angle of the light L propagating through the light guide plate 2.

However, the light extraction structure 23 provided in the rear side of the light guide plate 2 is not limited thereto. For example, of V-like grooves shown in FIG. 22, that is, of two inclination planes included in the V-like structure, an inclination plane closer to the light sources 3 may be responsible for changing the propagation angle of the light L.

Also in this case, assuming that an angle of the inclination plane responsible for changing the propagation angle of the light L, of the two inclination planes, is η2, the light guide plate 2 providing the maximum value of an indicator of the light emitted through the front surface 22 of the light guide plate 2 in the direction of the azimuth angle θ of 90° and the direction of the output angle α of 65° to 85° can be realized by setting the angle η2 of the inclination plane to be 0.5° to 3°. In addition, a pitch of the light extraction structure 23 is set to be several tens of μm to one hundred and several tens of μm. In addition, an angle η1 of the other inclination plane in the light extraction structure 23 may be selected such that loss of the light propagating through the light guide plate 2 decreases, and specifically may be selected in a range of 70° to 90°.

In addition, also if the V-like grooves are provided as the light extraction structure 23, by providing the polarization state converting structure 25 between two adjacent light extraction structures 23, the same effects as the light guide plate 2 illustrated in the first embodiment can be obtained.

Second Embodiment

Figure 23:
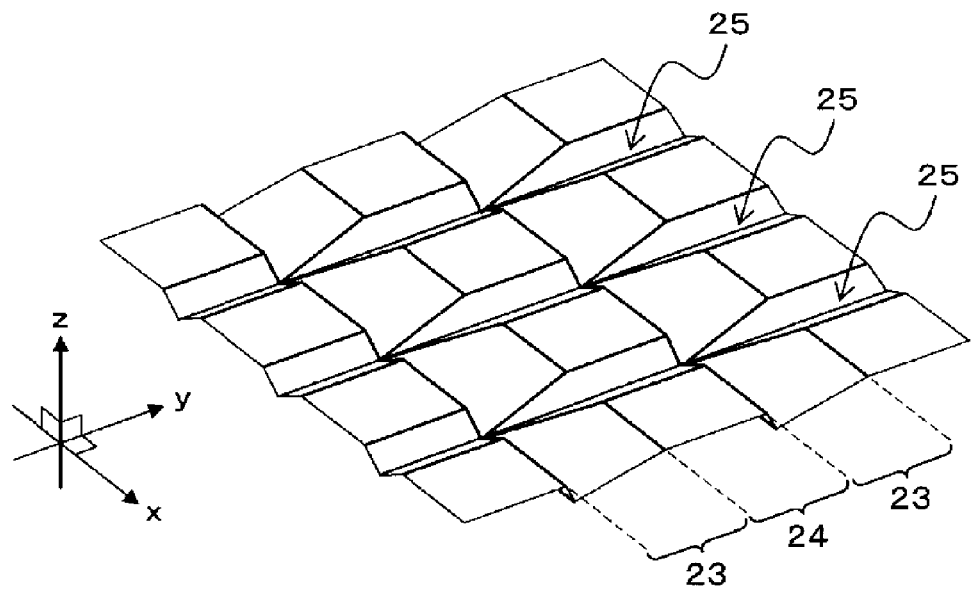
FIG. 23 is a schematic perspective view showing an example of a shape of a rear side of a light guide plate according to a second embodiment of the present invention.
Figure 24:
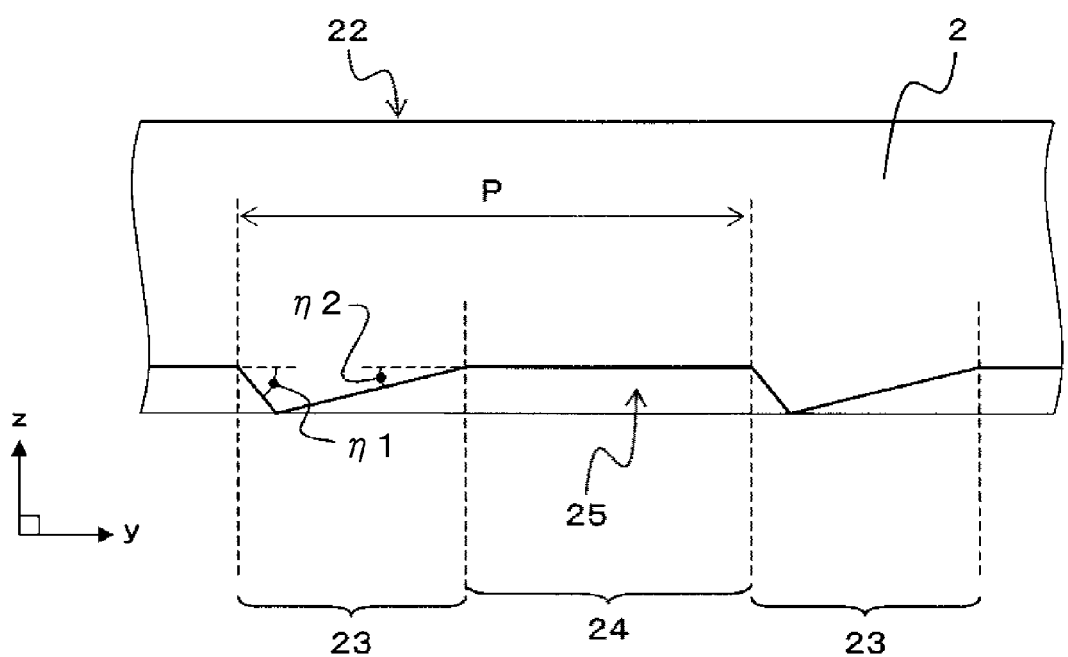
FIG. 24 is a schematic sectional view showing an example of a shape of a section of the light guide plate in a section in parallel to a yz plane in FIG. 23.
Figure 25:
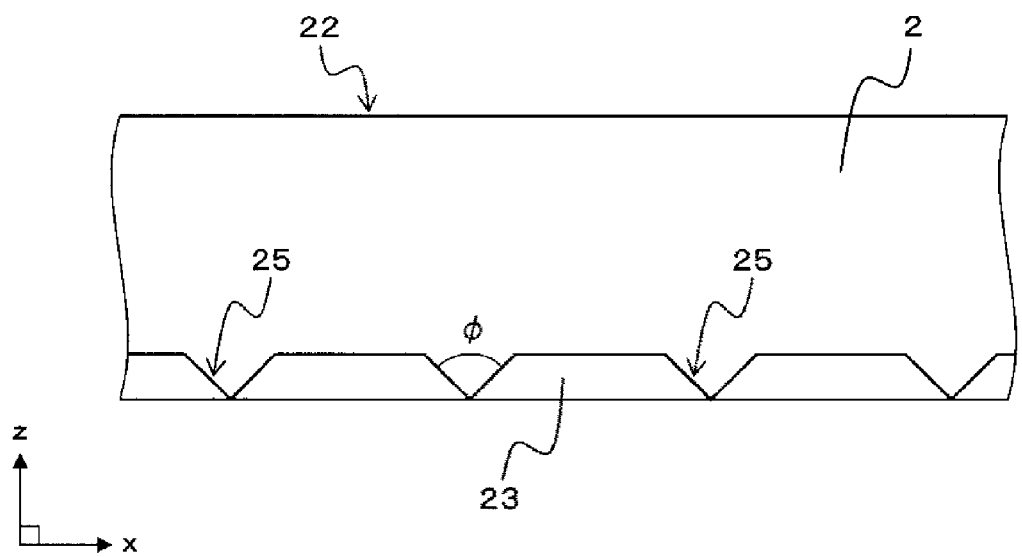
FIG. 25 is a schematic sectional view showing an example of a shape of a section of the light guide plate in a section in parallel to an xz plane in FIG. 23.

FIGS. 23 to 25 are schematic views showing an example of a general configuration of a light guide plate in an illuminating device according to a second embodiment of the present invention.

FIG. 23 is a schematic perspective view showing an example of a shape of a rear side of a light guide plate according to the second embodiment of the present invention. FIG. 24 is a schematic sectional view showing an example of a shape of a section of the light guide plate in a section in parallel to a yz plane in FIG. 23. FIG. 25 is a schematic sectional view showing an example of a shape of a section of the light guide plate in a section in parallel to an xz plane in FIG. 23.

x, y and z-axis directions in an xyz coordinate system shown in FIG. 23 are the same as the x, y and z-axis directions in the xyz coordinate system shown in FIG. 1, respectively.

In the second embodiment, a modification of the polarization state converting structure 25 provided in the rear side of the light guide plate 2 will be described based on the configuration of the illuminating device 1 of the first embodiment. Therefore, explanation about other configurations except the configuration of the rear side of the light guide plate 2 will be omitted.

The polarization state converting structure 25 in the light guide plate 2 used in the illuminating device 1 of the first embodiment is provided only in the area 24 between the light extraction structures 23 provided in the rear side of the light guide plate 2, as shown in FIG. 5 and so on. In contrast, in the light guide plate 2 of the second embodiment, for example as shown in FIGS. 23 to 25, the polarization state converting structure 25 is provided through the light extraction structures 23 and the area 24 between two light extraction structures 23. In this case, the polarization state converting structure 25 is a V-like structure as in the first embodiment, with its ridge line direction in parallel to the direction of the azimuth angle θ of 90° and an angle near it.

The light extraction structure 23 formed in the rear side of the light guide plate 2 is a V-like structure including two inclination planes, for example as shown in FIG. 24. In this case, the light sources 3 are arranged in the left side of the light guide plate 2 and, of the two inclination planes, an inclination plane farther from the light sources 3 is responsible for changing the propagation angle of the light L propagating through the light guide plate 2. Accordingly, assuming that an angle of the inclination plane farther from the light sources 3 in the light extraction structure 23 is η2, the angle η2 is 0.5° to 3° or so as described in the first embodiment. In addition, an angle η1 of the other inclination plane closer to the light sources 3 in the light extraction structure 23 may be selected from a range of 70° to 90°, as described in the first embodiment. In addition, a pitch P of the light extraction structure 23 may be set to be several tens of μm to one hundred and several tens of μm.

In addition, the light guide plate 2 of the second embodiment is provided with the polarization state converting structures 25 passing through the light extraction structures 23 and the area 24 lying between two light extraction structures 23. Accordingly, for example as shown in FIGS. 23 and 25, it is preferable that the polarization state converting structures 25 are intermittently arranged in a direction in parallel to the longitudinal direction (x-axis direction) of the end surface 21 of the light guide plate 2 in which the light sources 3 are arranged, with flat portions provided between adjacent polarization state converting structures 25. For example, this can increase the percentage of the p-polarized light component in light emitted through the front surface 22 of the light guide plate 2 while preventing conversion efficiency of the propagation angle from being decreased due to reduction of the inclination planes included in the light extraction structure 23.

In addition, as described above, the V-like structure provided as the polarization state converting structures 25 can change a polarization state on principle if the apex angle φ is less than 180°. However, in order to obtain a meaningful effect, it is preferable that the range of the apex angle φ is equal to or more than 80° and equal to or less than 130°. Furthermore, in order to effect a conversion from s-polarized light to p-polarized light with high efficiency, it is preferable that the apex angle φ is selected within a range equal to or more than 100° and equal to or less than 110°.

Also when the light guide plate 2 in the illuminating device 1 of the first embodiment is replaced with the light guide plate 2 of the second embodiment, light reflected from the front surface 22 into the rear side of the light guide plate 2 undergoes a change in its polarization state due to an action of the polarization state converting structure 25 when the light is reflected from the rear side, thereby decreasing the s-polarized component percentage. Accordingly, light directed toward the front surface 22 of the light guide plate 2 again has a greater p-polarized light component, and accordingly, it is possible to realize a light guide plate 2 to emit light having a higher p-polarized light component percentage.

In addition, unlike the light guide plate 2 of the first embodiment, in the light guide plate 2 of the second embodiment, a position at which the polarization state converting structures 25 are arranged is not limited to the area 24 lying between adjacent light extraction structures 23. Thus, the light guide plate 2 of the second embodiment has an advantage of increased freedom of design. In addition, since the polarization state converting structures 25 can be continuously arranged in the principal propagation direction of light (the direction of the azimuth angle θ of 90°) in the light guide plate 2, there is another advantage of assigning the function to convert a polarization state of light having a large s-polarized light component to the rear side of the light guide plate 2 uniformly.

In addition, although not shown, also in the light guide plate 2 of the second embodiment, the polarization state converting structure 25 has the ability to convert a polarization state and the optimal structure in terms of optics design or in a process of metallic molding or light guide plate forming may be selected. That is, since the polarization state converting structure 25 provided in the rear side of the light guide plate 2 works with the provision of an inclination plane including a ridge line in the direction of the azimuth angle θ of 90°, the optimal one of various possible structures may be selected depending on the use thereof. Accordingly, the polarization state converting structure 25 in the light guide plate 2 of the second embodiment is not limited to the structure as shown in FIGS. 23 and 25 but may be, for example, a structure including a flat portion provided between two inclination planes in a pair for conversion of a polarization state, as shown in FIG. 20.

In addition, it is believed that the parallelism of the direction of the ridge line of the inclination planes in the polarization state converting structure 25 to the direction of the azimuth angle θ of 90°, i.e., the principal propagation direction of the light propagating through the light guide plate is desirable for realization of the ability to convert a polarization state and preparing a metallic molding for formation of a polarization state converting means, although not limited thereto. That is, since a polarization state is changed when the direction of the ridge line of the inclination planes is a direction other than the direction of the azimuth angle θ of 0°, for example, the direction of the ridge line of the inclination planes may be deviated from the direction of the azimuth angle θ of 90° within a range of ±45° or ±20° or may zigzag or waver within this angular range.

Figure 26:
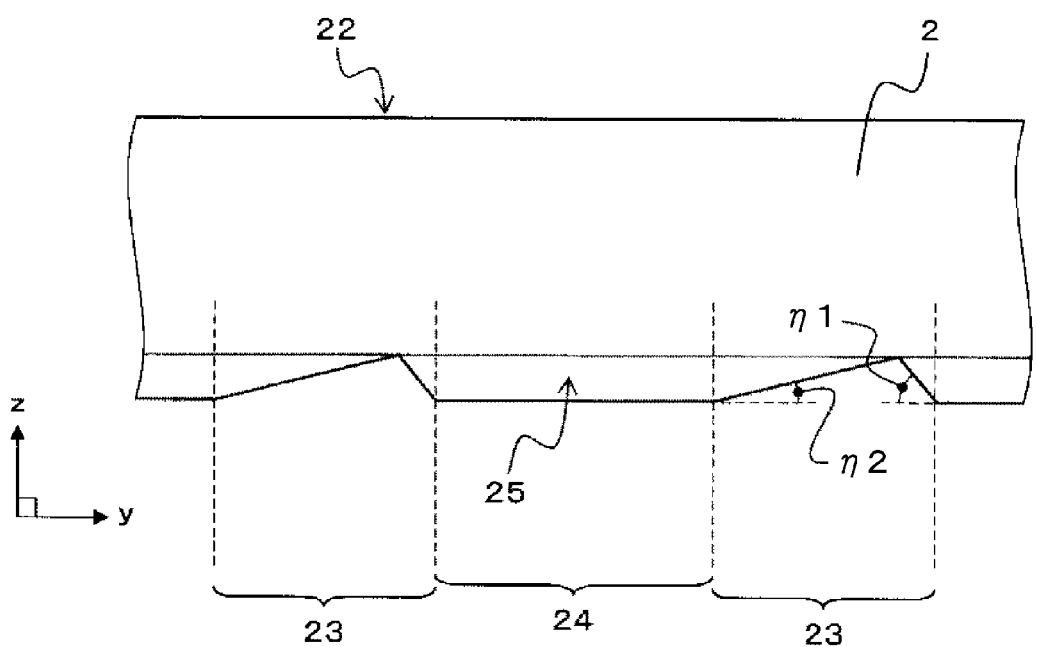
FIG. 26 is a schematic sectional view showing a modification of the light extraction structure in the light guide plate according to the second embodiment.

FIG. 26 is a schematic sectional view showing a modification of the light extraction structure in the light guide plate according to the second embodiment.

FIG. 26 shows a sectional configuration viewed from a section in parallel to a yz plane in an xyz coordinate system shown in FIG. 23, that is, a section in parallel to the principal propagation direction of the light propagating through the light guide plate 2, and a configuration viewed in the depth direction of the section.

In the second embodiment, an example of the light extraction structure 23 provided in the rear side of the light guide plate 2 includes the V-like structure as shown in FIGS. 23 and 24. For this structure, of two inclination planes included in the V-like structure, an inclination plane farther from the light sources 3 is responsible for changing the propagation angle of the light L propagating through the light guide plate 2.

However, the light extraction structure 23 provided in the rear side of the light guide plate 2 is not limited thereto. For example, of V-like grooves shown in FIG. 26, that is, of two inclination planes constituting the V-like structure, an inclination plane closer to the light sources 3 may be responsible for changing the propagation angle of the light L.

Also in this case, assuming that an angle of the inclination plane closer to the light sources 3 in the light extraction structure 23 is η2, the angle η2 may be set to be 0.5° to 3° or so. In addition, an angle η1 of the other inclination plane farther from the light sources 3 in the light extraction structure 23 may be selected from a range of 70° to 90°. In addition, a pitch P of the light extraction structure 23 may be set to be several tens of μm to one hundred and several tens of μm.

Third Embodiment

Figure 27:
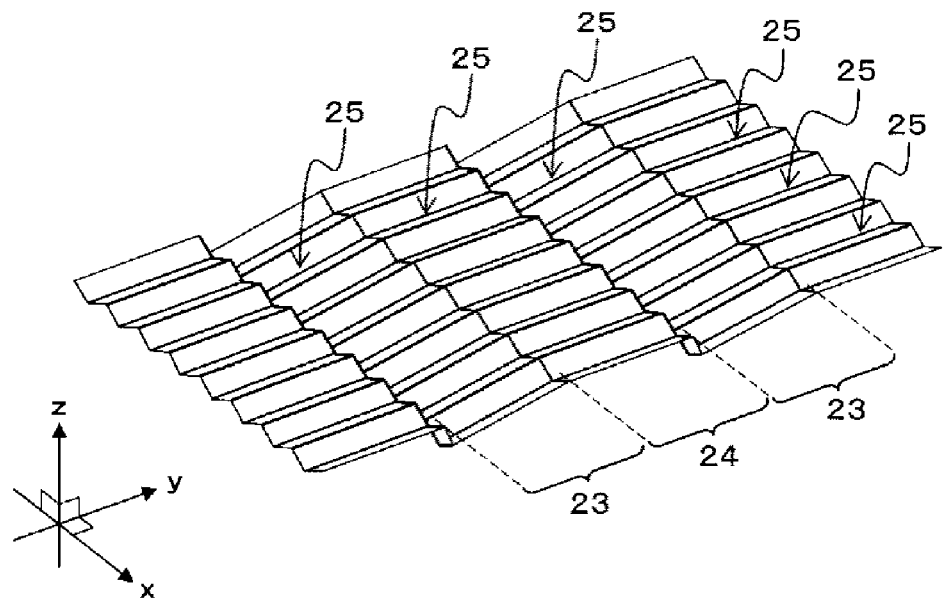
FIG. 27 is a schematic perspective view showing an example of a shape of a rear side of a light guide plate according to a third embodiment of the present invention.
Figure 28:
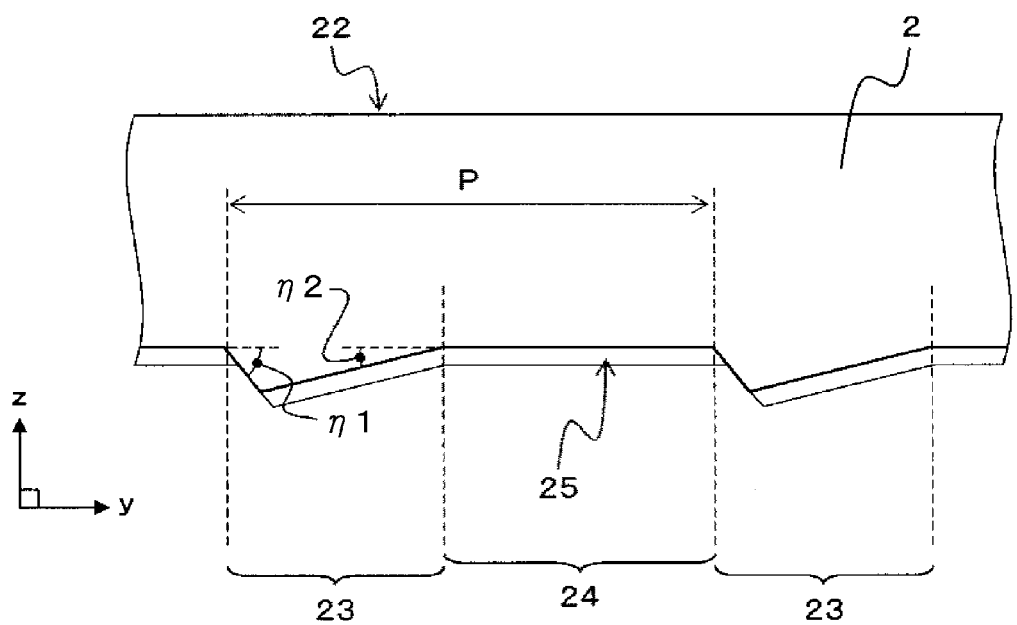
FIG. 28 is a schematic sectional view showing an example of a shape of a section of the light guide plate in a section in parallel to a yz plane in FIG. 27.
Figure 29:
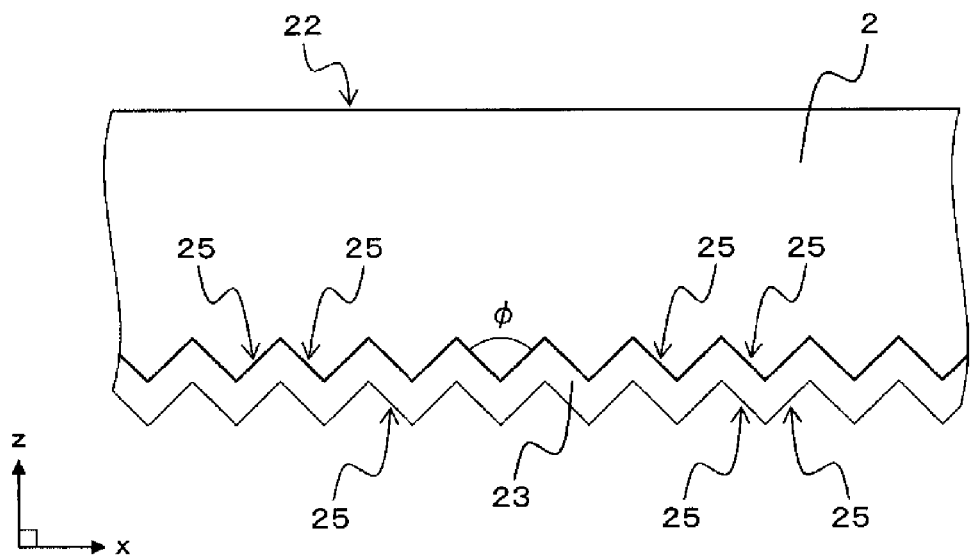
FIG. 29 is a schematic sectional view showing an example of a shape of a section of the light guide plate in a section in parallel to an xz plane in FIG. 27.

FIGS. 27 to 29 are schematic views showing an example of a general configuration of a light guide plate in an illuminating device according to a third embodiment of the present invention.

FIG. 27 is a schematic perspective view showing an example of a shape of a rear side of the light guide plate according to the third embodiment of the present invention. FIG. 28 is a schematic sectional view showing an example of a shape of a section of the light guide plate in a section in parallel to a yz plane in FIG. 27. FIG. 29 is a schematic sectional view showing an example of a shape of a section of the light guide plate in a section in parallel to an xz plane in FIG. 27.

x, y and z-axis directions in an xyz coordinate system shown in FIG. 27 are the same as the x, y and z-axis directions in the xyz coordinate system shown in FIG. 1, respectively.

In the third embodiment, a further modification of the polarization state converting structure 25 provided in the rear side of the light guide plate 2 will be described based on the configuration of the illuminating device 1 of the first embodiment. Therefore, explanation about other configurations except the configuration of the rear side of the light guide plate 2 will be omitted.

The polarization state converting structure 25 in the light guide plate 2 used in the illuminating device 1 of the first embodiment is provided only in the area 24 between the light extraction structures 23 provided in the rear side of the light guide plate 2, as shown in FIG. 5 and so on. In contrast, in the light guide plate 2 of the third embodiment, a V-like polarization state converting structure 25 is provided in not only the area 24 but also the light extraction structure 23. In this case, the polarization state converting structure 25 is a V-like structure as in the first embodiment, with its ridge line direction in parallel to the direction of the azimuth angle θ of 90° or an angle near thereto.

In addition, unlike the polarization state converting structure 25 in the light guide plate 2 of the second embodiment, in the polarization state converting structure 25 in the light guide plate 2 of the third embodiment, a portion passing the light extraction structure 23 in a ridge line in one V-like structure passing through the light extraction structures 23 and the area between the light extraction structures 23 is inclined in a direction in parallel to the inclination planes included in the light extraction structure 23 as shown in FIGS. 27 and 28.

The light extraction structure 23 formed in the rear side of the light guide plate 2 is a V-like structure constituted by two inclination planes, for example as shown in FIG. 28. In this case, the light sources 3 are arranged in the left side of the light guide plate 2 and, of the two inclination planes, an inclination plane farther from the light sources 3 is responsible for changing the propagation angle of the light L propagating through the light guide plate 2. Accordingly, assuming that an angle of the inclination plane farther from the light sources 3 in the light extraction structure 23 is η2, the angle η2 may be 0.5° to 3° or so as described in the first embodiment. In addition, an angle η1 of the other inclination plane closer to the light sources 3 in the light extraction structure 23 may be selected from a range of 70° to 90°, as described in the first embodiment. In addition, a pitch P of the light extraction structure 23 may be set to be several tens of μm to one hundred and several tens of μm.

In addition, of the inclination planes included in the light extraction structure 23, the inclination plane responsible for changing the propagation angle of the light L propagating through the light guide plate 2 has the same structure as the polarization state converting structure 25 provided in the area 24 lying between adjacent light extraction structures 23. That is, the inclination plane responsible for changing the propagation angle of the light L propagating through the light guide plate 2 has a structure (shape) in which the area providing the polarization state converting structure 25 between the adjacent light extraction structures 23 is inclined by the angle η2.

In addition, as described above, the V-like structure provided as the polarization state converting structures 25 can change a polarization state on principle if the apex angle ϕ is less than 180°. However, in order to obtain a meaningful effect, it is preferable that the apex angle ϕ falls within a range of 80° to 130°. Furthermore, in order to effect a conversion from s-polarized light to p-polarized light with high efficiency, it is preferable that the apex angle ϕ falls within a range of 100° to 110°.

Also when the light guide plate 2 in the illuminating device 1 of the first embodiment is replaced with the light guide plate 2 of the third embodiment, light reflected from the front surface 22 into the rear side of the light guide plate 2 undergoes a change in its polarization state due to an action of the polarization state converting structure 25 when the light is reflected from the rear side, thereby decreasing the s-polarized component percentage. Accordingly, light directed toward the front surface 22 of the light guide plate 2 again has a greater p-polarized light component, and accordingly, it is possible to realize a light guide plate 2 to emit light having a higher p-polarized light component percentage.

In addition, unlike the light guide plate 2 of the first embodiment, in the light guide plate 2 of the third embodiment, the polarization state converting structures 25 are arranged in both of the light extraction structure 23 and the area 24 lying between two light extraction structures 23. In addition, unlike the light guide plate 2 of the second embodiment, the polarization state converting structures 25 in the light extraction structure 23 are the same as the polarization state converting structures 25 in the area 24 lying between two light extraction structures 23 except for the inclination angle. In addition, in the light extraction structure 23 in the light guide plate 2 of the third embodiment, a plane responsible for changing the propagation angle of the light L also acts as the polarization state converting structures 25. Accordingly, the light guide plate 2 of the third embodiment has an advantage over the light guide plate 2 of the second embodiment in that a polarization state can be more uniformly converted within a plane of the light guide plate 2.

In addition, although not shown, also in the light guide plate 2 of the third embodiment, the polarization state converting structure 25 has the ability to convert a polarization state and the optimal structure in terms of optics design or in a process of metallic molding or light guide plate forming may be selected. That is, since the polarization state converting structure 25 provided in the rear side of the light guide plate 2 works with provision of an inclination plane having a ridge line in the direction of the azimuth angle θ of 90°, an optimal one of various possible structures may be selected depending on their use. Accordingly, the polarization state converting structure 25 in the light guide plate 2 of the third embodiment is not limited to the structure as shown in FIGS. 27 and 29 but may be, for example, a structure including a flat portion provided between two inclination planes in a pair for conversion of a polarization state, as shown in FIG. 20.

In addition, it is believed that the parallelism of the direction of the ridge line of the inclination planes in the polarization state converting structure 25 to the direction of the azimuth angle θ of 90°, i.e., the principal propagation direction of the light propagating through the light guide plate 2 is desirable for realization of the ability to convert a polarization state and preparing a metallic molding for formation of a polarization state converting means, although not limited thereto. That is, since a polarization state is changed when the direction of the ridge line of the inclination planes is a direction other than the direction of the azimuth angle θ of 0°, for example, the direction of the ridge line of the inclination planes may be deviated from the direction of the azimuth angle θ of 90° within a range of ±45° or may zigzag or waver within this angular range.

In addition, although in the third embodiment as one example of the light extraction structure 23 provided in the rear side of the light guide plate 2 is illustrated with the V-like structure as shown in FIGS. 27 and 28, the light extraction structure 23 is not limited thereto. For example, of V-like grooves shown in FIGS. 22 and 26 and so on, that is, of two inclination planes constituting the V-like structure, an inclination plane closer to the light sources 3 may be responsible for changing the propagation angle of the light L.

Fourth Embodiment

Figure 30:
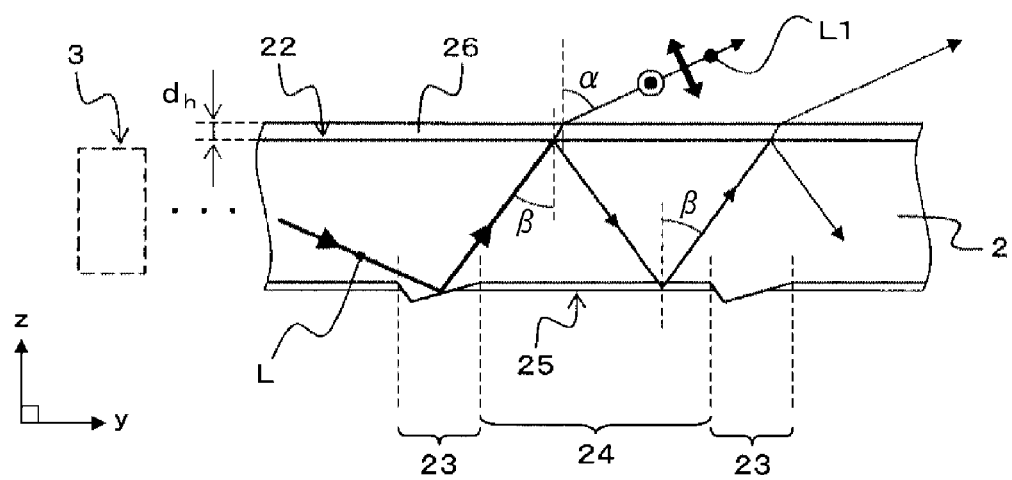
FIG. 30 is a schematic sectional view showing an example of a sectional structure of a light guide plate in an illuminating device according to a fourth embodiment of the present invention.

FIG. 30 is a schematic sectional view showing an example of a sectional structure of a light guide plate in an illuminating device according to a fourth embodiment of the present invention.

FIG. 30 shows a sectional configuration viewed from a section in parallel to the yz plane in the xyz coordinate system shown in FIG. 1, that is, a section in parallel to the principal propagation direction of the light propagating through the light guide plate 2, and a configuration viewed in the depth direction of the section.

The light guide plate 2 in each of the illuminating devices 1 of the first to third embodiments has Configuration 1, Configuration 2 and Configuration 4. It is however preferable that the illuminating device 1 has one or both of Configuration 4 and Configuration 5 in addition to Configuration 1 and Configuration 2 as required. Thus, the fourth embodiment will be illustrated with Configuration 5 as another example of preferred configurations of the illuminating device 1, that is, an example configuration including a layer having a refractive index higher than that of the light guide plate 2 (hereinafter referred to as a high refractive index layer) on the front surface 22. In addition, the illuminating device of the fourth embodiment is merely to modify the configuration of the light guide plate 2 based on the configuration of the illuminating device 1 of the first embodiment. Therefore, explanation regarding configurations other than the configuration of the light guide plate 2 will be omitted.

As shown in FIG. 30, for example, a high refractive index layer 26 is formed on the front surface 22 of the light guide plate 2, in the fourth embodiment.

The light guide plate 2 serves to convert the light L emitted from the light sources 3 into a surface light ray and includes Configuration 1 and Configuration 2. Thus, the light guide plate 2 is formed of a rectangular plate-like member transparent to visible light and includes the light extraction structure 23 to emit the light L, which is incident from the end surface 21 and propagates through the light guide plate 2, through the front surface 22.

The light extraction structure 23 has the same structure as that of the light guide plate 2 of the first to third embodiments, for example a V-like structure including two inclination planes having a ridge line in a direction in parallel to the direction of the azimuth angle θ of 0°.

In addition, like the light guide plates 2 of the first to third embodiments 3, the light guide plate 2 may be made of a birefringent material having a direction of the fast axis AX1 as the direction of the azimuth angle θ of 90°. However, in order to clarify operation and effects by Configuration 5, the fourth embodiment will be illustrated with use of a light guide plate 2 made of optically substantially isotropic polycarbonate resin having an average refractive index of about 1.57. In addition, in the fourth embodiment, a case where output angles α providing the maximum luminance and luminous intensity of the light L1 emitted through the front surface 22 in the direction of the azimuth angle θ of 90° are 76° and 68°, respectively, will be described, although not limited thereto.

In this case, for the light L1 whose output angle α is 76°, when the light passes through an interface between the light guide plate 2 and air, a degree of polarization $\rho_p$ of p-polarized light in output light is about 23% due to a difference between transmittances of p-polarized light and s-polarized light. More specifically, since 88% of the p-polarized light is transmitted and only 45% of the s-polarized light is transmitted, in the light remaining in the light guide plate 2 by being reflected from the interface between the light guide plate 2 and air, an s-polarized light component is about 4.6 times as much as a p-polarized light component.

In addition, by forming the high refractive index layer 26 having a refractive index higher than that of the light guide plate 2 on the front surface 22 of the light guide plate 2, it is possible to increase the p-polarized light component in the light emitted from the light guide plate 2. In this case, a thickness $d_h$ of the high refractive index layer 26 may be set to satisfy the following conditions on an angle providing the maximum luminance or luminous intensity of the light emitted from the light guide plate 2.

Specifically, assuming that a refractive index of the high refractive index layer 26 is $n_h$ and an angle at which light emitted at an angle providing the maximum luminance or luminous intensity in the light emitted from the light guide plate 2 propagates into the high refractive index layer 26 is ξ, the thickness $d_h$ of the high refractive index layer 26 may be set to satisfy the following equation 3.

$$d_h = \lambda/(4 \cdot n_h \cdot \cos \xi) \cdot (2m+1) \qquad \text{(Equation 3)}$$

In Equation 3, the angle ξ is an angle from the perpendicular direction (z-axis direction) of the front surface 22 of the light guide plate 2, that is, an incident angle at an interface between the high refractive index layer 26 and an air layer. In addition, in Equation 3, λ is a visible wavelength and m is an integer arbitrarily. The wavelength λ is sufficient only if it is a visible wavelength, for example, 550 nm providing high photopic sensitivity. Although the thickness $d_h$ of the high refractive index layer 26 may be a value obtainable with m set to be an integer of equal to or more than 1 in Equation 3, since an effect of wavelength dependence of a refractive index of a transparent medium constituting the high refractive index layer 26 is increased with increase of the thickness $d_h$, it is preferable to select the thickness $d_h$ calculated with m=0.

Based on the above conditions, the following table 1 shows an example of a relationship between a material which can be used to form the high refractive index layer 26, its refractive index, and its optimal thickness $d_h$ for light whose output angle α is 76°.

TABLE 1

| Material | $n_h$ | $d_h$ (nm) | $T_p$ (%) | $R_s$ (%) | $\rho_p$ (%) |
|---|---|---|---|---|---|
| (without layer) | — | — | 88 | 45 | 23 |
| UVCR | 1.65 | 103 | 89 | 51 | 29 |
| UVCR | 1.70 | 99 | 90 | 54 | 32 |
| SiN etc. | 1.85 | 87 | 93 | 62 | 41 |
| Ta$_2$O$_5$ etc. | 2.00 | 79 | 95 | 68 | 49 |
| TiO$_2$, ZnS, etc. | 2.35 | 65 | 99 | 77 | 62 |

Table 1 also shows a transmittance $T_p$ (%) of p-polarized light, a reflectance $R_s$ (%) of s-polarized light and a degree of polarization $\rho_p$ (%) of p-polarized light at the interface between the light guide plate 2 and air when the refractive index of the light guide plate 2 is 1.5705 (That is, for comparison table 1 also shows a transmittance $T_p$ (%) of p-polarized light, a reflectance $R_s$ (%) of s-polarized light and a degree of polarization $\rho_p$ (%) of p-polarized light when the high refractive index layer 26 is not present). In Table 1, UVCR is ultraviolet curable resin. In the following description, unless stated otherwise, the (average) refractive index of the light guide plate 2 is 1.5705.

As can be seen from Table 1, when the high refractive index layer 26 is formed, the transmittance $T_p$ of p-polarized light and the reflectance $R_s$ of s-polarized light at the interface between the light guide plate 2 and air are both increased. Accordingly, light emitted from the light guide plate 2 with the high refractive index layer 26 on the front surface 22 has a greater p-polarized light component. In addition, a higher refractive index of the high refractive index layer 26 provides better effects.

Examples of methods of forming the high refractive index layer 26 at relative low costs may include a method of coating a lyotropic liquid crystal with addition of a shear stress and a method of using ultraviolet curable resin. However, a refractive index of the high refractive index layer 26 which can be obtained by such methods is 1.7 or so. A higher refractive index may be achieved by a method of using a material such as SiN, Ta$_2$O$_5$, TiO$_2$, ZnS, etc. However, these materials require high product costs although they provide better effects. Accordingly, in actual applications, conditions to meet relevant products may be selected with a balance between costs and effects.

Even when the high refractive index layer 26 is formed in this manner, in reality, the amount of p-polarized light component in light emitted from the light guide plate 2 is smaller than an expected value due to a difference in reflection between the p-polarized light and the s-polarized light at the interface between the light guide plate 2 and air. It is believed that this is because the light remaining in the light guide plate by being reflected from the interface between the light guide plate 2 and air has more of the s-polarized light component than the p-polarized light component. For example, if the refractive index of the high refractive index layer 26 is 2.0, since 95% of the p-polarized light is transmitted and only 23% of the s-polarized light is transmitted, in the light remaining in the light guide plate by being reflected from the interface between the light guide plate 2 and air, the s-polarized light component is about 15 times as much as the p-polarized light component. Thus, in order to further increase the percentage of p-polarized light component in the light emitted from the light guide plate 2, it is believed that it is very effective to convert the s-polarized light remaining in the light guide plate into the p-polarized light effectively.

For the efficient conversion of the s-polarized light remaining in the light guide plate 2 into the p-polarized light, the light guide plate 2 in the illuminating device of the forth embodiment contains Configuration 2, that is, the polarization state converting structure 25 provided in the rear side of the light guide plate 2. The structure, operation and effects of the polarization state converting structure 25 are as described in the first to third embodiments. Thus, also in the fourth embodiment, by reflecting light having more of the s-polarized light component reflected from the front surface 22 from the polarization state converting structure 25, light directed toward the front surface 22 of the light guide plate 2 again has a greater p-polarized light component, and accordingly, it is possible to realize a light guide plate 2 to emit light having a higher percentage of p-polarized light component.

In addition, as in the fourth embodiment, when the high refractive index layer 26 having an intended thickness $d_h$ is formed, the transmittance $T_p$ of p-polarized light and the reflectance $R_s$ of s-polarized light at the front surface 22 are both increased. Accordingly, when some of the light having more of the s-polarized light component reflected from the front surface 22 redirects toward the front surface 22 of the light guide plate 2 after being converted into p-polarized light component by the polarization state converting structure 25, a greater p-polarized light component is obtained. That is, the light guide plate 2 of the fourth embodiment can emit light having a greater p-polarized light component due to a synergy effect of the high refractive index layer 26 and the polarization state converting structure 25.

Fifth Embodiment

Figure 31:
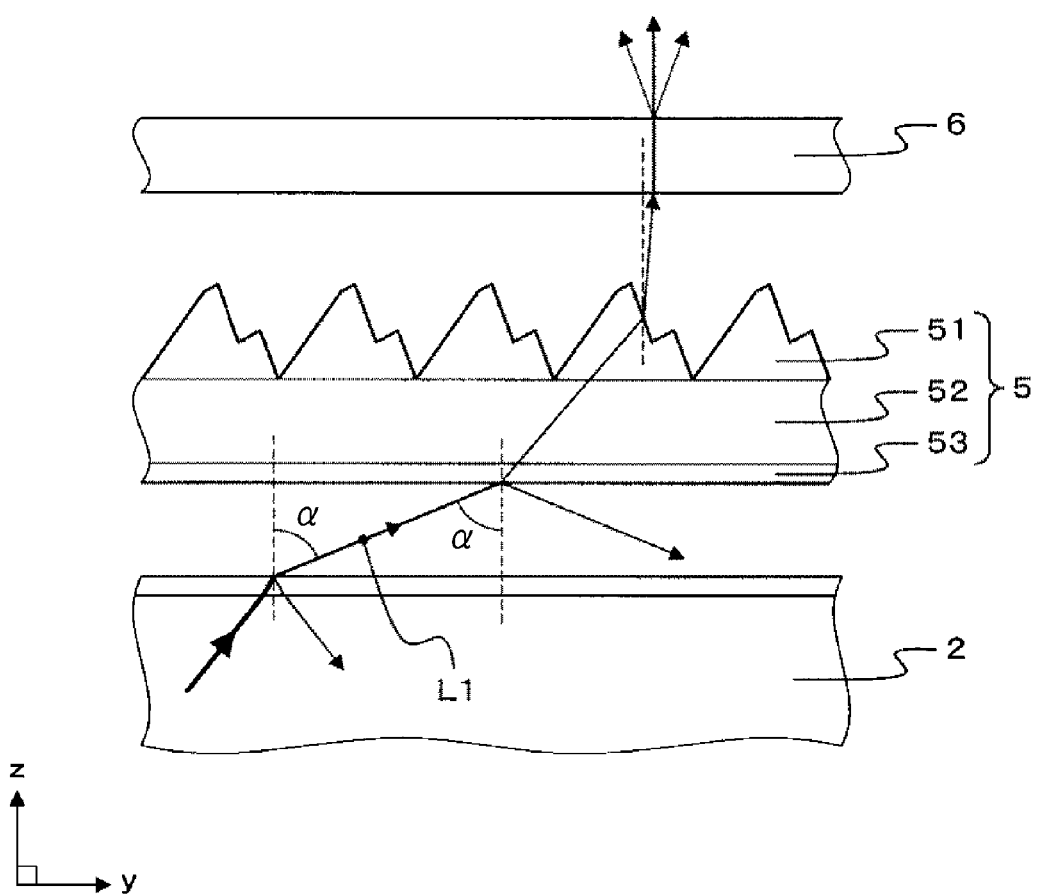
FIG. 31 is a schematic sectional view showing an example of a general configuration of a prism sheet in an illuminating device according to a fifth embodiment of the present invention.

FIG. 31 is a schematic sectional view showing an example of a general configuration of a prism sheet in an illuminating device according to a fifth embodiment of the present invention.

FIG. 31 shows a sectional configuration viewed from a section in parallel to a yz plane in an xyz coordinate system shown in FIG. 1, that is, a section in parallel to the principal propagation direction of the light propagating through the light guide plate 2.

In the first to fourth embodiments, the configurations of the light guide plate 2 of the illuminating device 1 of the present invention, that is, Configuration 1, Configuration 2, Configuration 4 and Configuration 5, have mainly been described. In the fifth embodiment, an example of Configuration 3, that is, a preferred configuration of a prism sheet 5, will be described. In addition, the illuminating device of the fifth embodiment is merely to modify the configuration of the prism sheet 5 based on the configuration of the illuminating device 1 of the first embodiment. Therefore, explanation regarding configurations other than the configuration of the prism sheet 5 will be omitted.

As shown in FIG. 31, for example, for practical use from a standpoint of industrial availability such as productivity, the prism sheet 5 includes a transparent film as a base material 52, and an array of prisms 51 formed on the surface of the base material 52. In this case, a transparent medium which produces no phase difference between p-polarized light components of the light L1 passing through the prism sheet 5 is used as the base material 52. This is because a loss of p-polarized light component caused by a change in p-polarized light emitted from the light guide plate 2 and passing through the prism sheet 5 is prevented, and light having a higher percentage of p-polarized light is emitted from the prism sheet 5.

In addition, in order to further increase a percentage of p-polarized light component in the passing light L1, the prism sheet 5 of the fifth embodiment is provided with an s-polarized light high reflecting layer 53 on a side opposing the side of the base material 52 on which the prisms 51 are formed. A shape of the prisms 51 and detailed configuration of the s-polarized light high reflecting layer 53 will be described later.

For example, at least an optically isotropic transparent medium having little in-plane birefringence, such as a tri-acetylcellulose film or a non-stretched polycarbonate film, can be used as the base material 52. In addition, a transparent medium having uniaxial anisotropy of a refractive index in a plane for example by uniaxially stretching a film made of polycarbonate resin or olefin resin can be used as the base material 52. In addition, if the transparent medium having uniaxial anisotropy of the refractive index is used as the base material 52, in order to prevent a phase difference from being produced in p-polarized light passing through the prism sheet 5, it is important to place the prism sheet 5 such that a slow axis of the base material 52 is set to be in the direction of azimuth angle θ of 0° or 90°.

In addition, from a standpoint of industrial availability, a PET (polyethyleneterephthalate) film which is relatively inexpensive and easy to handle may be used as the base material 52. However, if the PET film is used as the base material 52, since the PET film has biaxial anisotropy, a consideration is required to prevent a phase difference from being produced in p-polarized light passing through the prism sheet 5.

Figure 32:
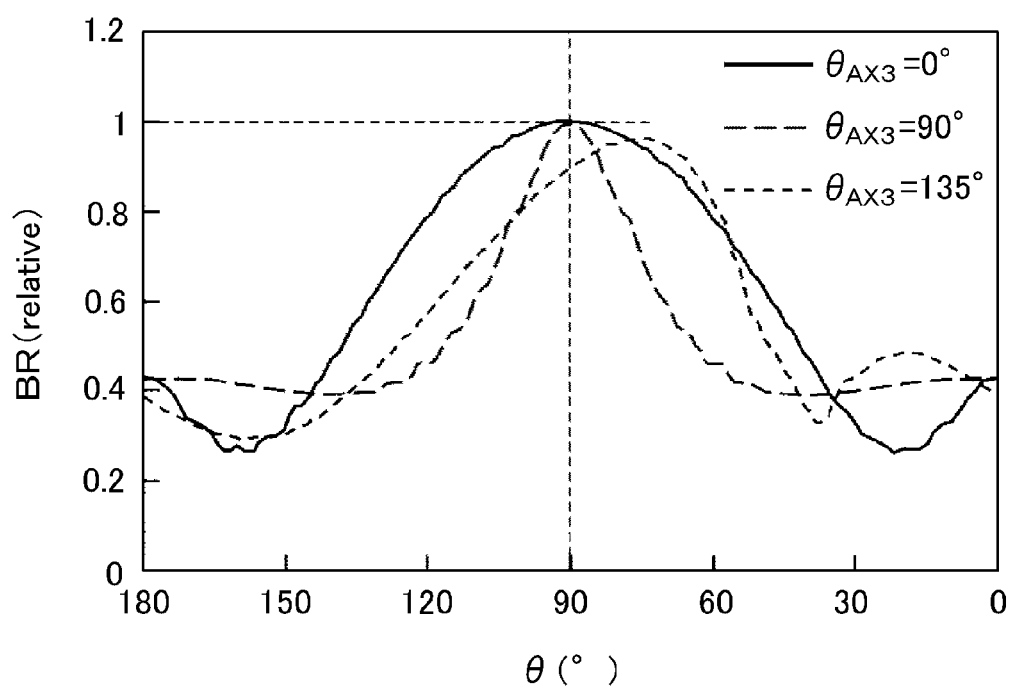
FIG. 32 is a graph showing an example of a relationship between an azimuth angle and a transmittance when p-polarized light is incident into a biaxial anisotropic transparent medium modeled with a PET film.

A graph of FIG. 32 shows a result of simulation of a transmittance of p-polarized light when p-polarized light is incident into a biaxial anisotropic transparent medium (principal refractive index: $n_x$=1.68, $n_y$=1.62 and $n_z$=1.47, thickness: 50 μm) modeled with a PET film. Specifically, this graph shows a relationship between an azimuth angle and a transmittance of light represented by a relative luminance with an incident angle α of p-polarized light set to 76°. The graph of FIG. 32 also shows a simulation result when an azimuth angle $θ_{AX3}$ of a slow axis in a transparent medium is 135°, 0° and 90°.

As can be seen from FIG. 32, in the biaxial anisotropic transparent medium, by setting the azimuth angle $θ_{AX3}$ of the slow axis to 0° or 90°, no phase difference is produced in the p-polarized light propagating at a predetermined incident angle α in the direction of azimuth angle θ of 90°, which results in no reduction of p-polarized light component. In addition, by setting the azimuth angle $θ_{AX3}$ of the slow axis to 0°, a phase difference produced in the p-polarized light in a wider range including the azimuth angle of 90° is decreased to prevent the p-polarized light from being lost.

When the transparent medium is used as the base material 52 of the prism sheet 5, considering an angular distribution of light emitted from the light guide plate 2, an angular range to be especially considered for light passing through the prism sheet 5 includes a range of azimuth angle θ of 90°±15° and a range of incident angle α of 60° to 85°. Thus, when the biaxial anisotropic transparent medium such as the PET film is used as the base material 52 of the prism sheet 5, it is preferable to set the azimuth angle $θ_{AX3}$ of the slow axis to 0° or 90°, that is, make the slow axis in parallel or perpendicular to a ridge line direction of the prisms 51. In addition, since more p-polarized light can be emitted from the prism sheet 5 when the azimuth angle $θ_{AX3}$ of the slow axis is set to 0° as described above, it is more preferable to make the slow axis of the transparent medium (the base material 52) in parallel to the ridge line direction of the prisms 51. In addition, although it is preferable to set the ridge line direction of the prisms 51 and the slow axis of the base material 52 to meet the above conditions in order to achieve higher effects, an angular variation due to a difference between actual products may be considered, in which case a tolerance of ±5° is allowed.

A great difference in effects between the azimuth angle $θ_{AX3}$ of the slow axis set to 0° and the azimuth angle $θ_{AX3}$ of the slow axis set to 90° when the biaxial anisotropic transparent medium is used as the base material 52 of the prism sheet 5 in this manner is in contrast to the prevention of loss of p-polarized light in both of the azimuth angle of the slow axis set to 90° and 0° when the uniaxial anisotropic transparent medium is used as the base material 52.

Figure 33:
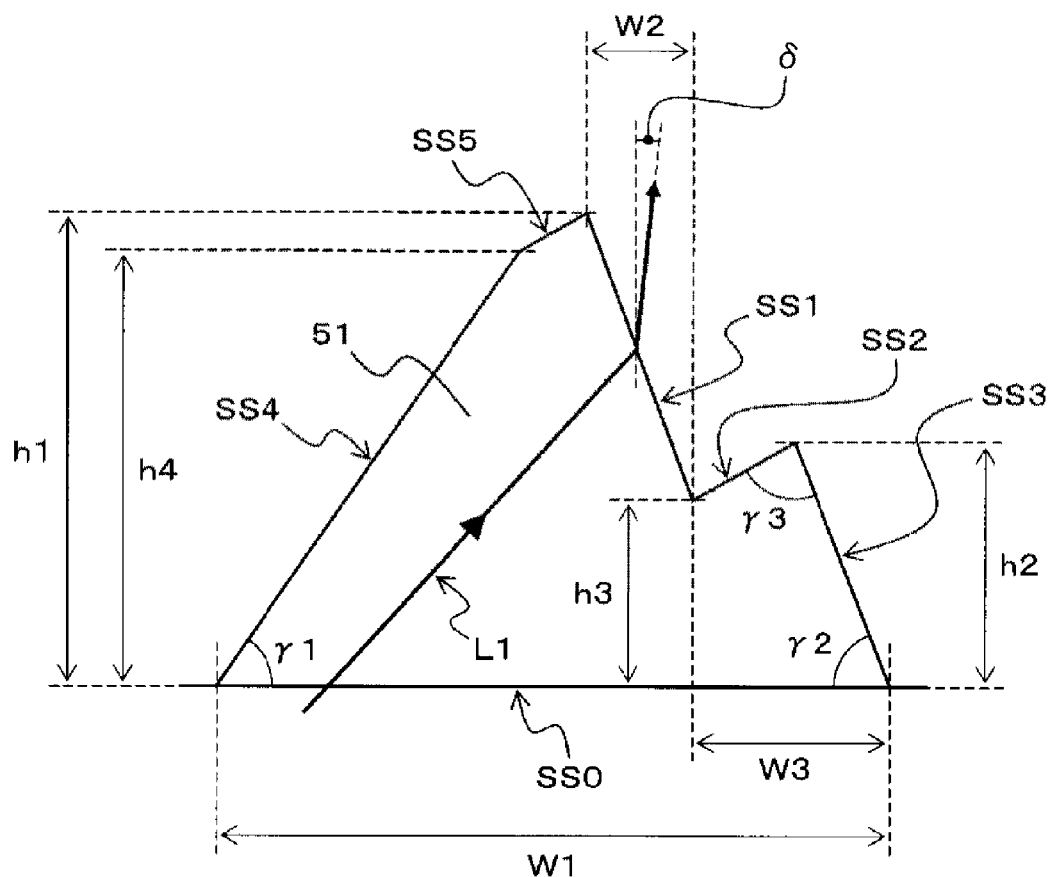
FIG. 33 is a schematic sectional view showing an example of a sectional shape of prisms in a prism sheet.

FIG. 33 is a schematic sectional view showing an example of a sectional shape of the prisms in the prism sheet.

FIG. 33 shows an enlargement of the prisms 51 in the prism sheet 5 shown in FIG. 31.

The prism sheet 5 in the illuminating device 1 according to the fifth embodiment of the present invention includes Configuration 3, that is, the configuration to refract light, which is incident at an angle providing the maximum luminance or luminous intensity, of the light emitted from the light guide plate 2 in the front direction (+z direction), and is formed of a transparent medium which produces no phase difference when the light passes through the prism sheet. Although the prism sheet 5 to satisfy the conditions of Configuration 3 may be implemented in various ways as known in the art, the fifth embodiment is illustrated with a configuration to prevent a color change which may occur when a viewing angle (polar angle) is changed in the direction of azimuth angle (θ=90°) perpendicular to a ridge line of the prisms 51, as one example of more preferred configurations. This configuration is disclosed in, for example, Japanese Patent No. 4250192, and its main features are as follows.

A sectional shape of the prisms includes a plurality of inclination planes, each including two principal inclination angles. Prisms relatively farther from light sources when viewed from their apexes contains at least three inclination planes, at least one of which has a reverse slope with respect to other inclination planes when viewed from a light output plane of the prism sheet. Here, the phase 'two principal inclination angles' refers to angles of an inclination plane closer to and relatively farther from the light sources when viewed from the prism apexes (the farthest point from a plane into which light from the light guide plate is incident), particularly one of the inclination angle at which light incident into the prism sheet at an angle providing the maximum luminance or luminous intensity, of the light emitted from the light guide plate, is refracted in the front direction, and the other of the inclination angle at which almost no light is directly incident.

The sectional shape of the prism 51 in the prism sheet 5 of the fifth embodiment corresponds to a combination of a side SS0 contacting the base material 52 and 5 inclination planes SS1 to SS5 including two main inclination angles γ1 and γ2, for example as shown in FIG. 33. In addition, when viewing the prisms 51 in the direction shown in FIG. 33, the light sources 3 are placed in the left side of the prisms 51.

Among the five inclination planes SS1 to SS5, inclination planes having the inclination angle γ2 at which the light L1 emitted from the light guide plate 2 and incident into the prism sheet 5 is refracted in the front direction is the inclination plane SS1 and the inclination plane SS3. In addition, an inclination plane having the main inclination angle γ1 at which light emitted from the light guide plate 2 and incident into the prism sheet 5 at an angle providing the maximum luminance or luminous intensity is not incident is the inclination plane SS4. In addition, although the inclination plane SS2 is an inclination plane into which the light emitted from the light guide plate 2 is incident at the angle providing the maximum luminance or luminous intensity, the inclination plane SS2 refracts the light in a direction different from the inclination planes SS1 and SS3 and has a reverse slope to the inclination planes SS1 and SS3. In addition, inclination plane SS5 is an inclination plane formed to prevent a leading end of the prisms 51 from having an acute angle since a manufacturing problem may occur if the leading end of the prisms 51 has such an acute angle.

A pitch of a prism array (the entire width W1) and the height h1 of the prisms 51 are, to be practical, several tens of μm or so. Detailed dimensions and inclination angles of the prisms 51 may be selected through an optical simulation or the like depending on a refractive index of the transparent medium constituting the base material 52 or the prisms 51 in the prism sheet 5.

An example of the dimensions and inclination angles of the prisms 51 is as follows.

First, in the prisms 51, the entire width W1 is set to 35 μm, the height h1 set to about 25 μm, the inclination angle γ2 of the inclination planes SS1 and SS3 set to about 69°, and the inclination angle γ1 of the inclination plane SS4 set to about 58°. In addition, the width W2 of the inclination plane SS1 in an xy plane is set to about 6 μm and the width W3 of a combination of the inclination planes SS2 and SS3 in the xy plane is set to about 12 μm. In addition, the height h2 of the inclination plane SS3 is set to about 13 μm, the height h3 of a connection side of the inclination plane SS1 and the inclination plane SS2 set to about 9 μm, and the height h4 of the inclination plane SS4 set to about 25 μm. In addition, an angle γ3 formed between the inclination plane SS2 and the inclination plane SS3 is set to about 80°.

When the shape of the prisms 51 is set as above, assuming that the average refractive index of the base material 52 of the prism sheet 5 is 1.65 and the refractive index of the prisms 51 is 1.68, for light having an output angle α of 77° of the light L1 emitted from the light guide plate 2, an angle δ of light emitted through the inclination plane SS1 or the inclination plane SS3 of the prisms 51 is 0.5° and this light is emitted substantially in the front direction (+z direction) of the illuminating device 1. In addition, assuming that the average refractive index of the base material 52 is 1.65 and the refractive index of the prisms 51 is 1.64, for light having an output angle α of 68° providing the maximum luminous intensity of the light L1 emitted from the light guide plate 2, an angle δ of light emitted through the inclination plane SS1 or the inclination plane SS3 of the prisms 51 is 0.2° and this light is emitted substantially in the front direction.

In addition, some of light emitted from the light guide plate 2 at a peak angle providing the maximum luminance or luminous intensity is incident onto the inclination plane SS2 when it passes through the prism sheet 5 (prisms 51). The inclination plane SS2 has a reverse slope to the inclination planes SS1 and SS3. Accordingly, most of the light emitted from the light guide plate 2 is refracted in a direction in which the light sources 3 are arranged (the direction of azimuth angle θ of 270°) when it passes through the prism sheet 5, whereas some of the light passing through the inclination plane SS2 is refracted in a reverse direction (the direction of azimuth angle θ of 90°). In this case, due to a wavelength dependence of the refractive index of the transparent medium included in the prism sheet 5, some of a color change produced when the light is refracted is averaged. Accordingly, such a color change can be suppressed since it is produced due to the wavelength dependence of the refractive index of the transparent medium.

The prisms 51 employ an optically isotropic transparent medium or a transparent medium which does not produce a phase difference harmful to p-polarized light passing therethrough. This is for preventing p-polarized light component from being lost due to a change in the p-polarized light emitted from the light guide plate 2 and passing through the prisms 51 and emitting light having a higher percentage of p-polarized light component from the prisms 51, like the base material 52 in the prism sheet 5.

Accordingly, if the above requirements are met, any transparent medium such as ultraviolet curable resin or thermosetting resin may be used as the transparent medium included in the prisms 51. In addition, in order to obtain a desired refractive index, for example, as necessary, transparent particles having a high refractive index, such as titanium oxide or the like, may be contained in the transparent medium. In addition, if such particles are contained, it is preferable to set the diameter of the particles to several nm to several tens of nm or so as to decrease scattering of light in at least a visible wavelength range.

The s-polarized light high reflecting layer 53 provided in the rear side of the prism sheet 5 serves to reflect more of the s-polarized light component when light of an angle providing at least the maximum luminance or luminous intensity of the light emitted from the light guide plate 2 is incident into the prism sheet 5. That is, the s-polarized light high reflecting layer 53 acts to reflect more of the s-polarized light component, as compared to when light emitted from the light guide plate 2 at an angle providing the maximum luminance or luminous intensity is directly incident into the base material 52 in the prism sheet 5 which does not have the s-polarized light high reflecting layer 53. In addition, for light incident perpendicular to the prism sheet 5, a reflectance of s-polarized light need not be necessarily different from that of p-polarized light. However, in order to realize a structure to reflect more of the s-polarized light component for the perpendicularly incident light, for example, there is a need to form a plurality of layers having different birefringent property. However, this may lead to increased thickness and high costs.

Meanwhile, the s-polarized light high reflecting layer 53 in the prism sheet 5 of the fifth embodiment may have a structure to reflect more of the s-polarized light component, particularly for light of an angle providing at least the maximum luminance or luminous intensity of the light emitted from the light guide plate 2. That is, the s-polarized light high reflecting layer 53 may reflect more of the s-polarized light component for light incident oblique to the prism sheet 5. In addition, since the s-polarized light high reflecting layer 53 can be provided by forming a single layer on the prism sheet 5 or changing a shape of a surface of the prism sheet 5, as will be described later, the s-polarized light high reflecting layer 53 is less limited in terms of thickness and costs than the structure to reflect more of the s-polarized light component for the perpendicularly incident light.

The s-polarized light high reflecting layer 53 may be formed of a single transparent layer having a refractive index higher than that of the base material 52 of the prism sheet 5 and may have a thickness $d_s$ to meet the following condition for an angle providing the maximum luminance or luminous intensity of the light emitted from the light guide plate 2. That is, assuming that a refractive index of the s-polarized light high reflecting layer 53 is $n_s$ and an angle at which light incident into the prism sheet 5 at an angle providing the maximum luminance or luminous intensity of the light emitted from the light guide plate 2 propagates through the s-polarized light high reflecting layer 53 is ∈, the film thickness $d_s$ of the s-polarized light high reflecting layer 53 may satisfy the following equation 4.

$$d_s = \lambda/(4 \cdot n_s \cdot \cos \in) \cdot (2m+1) \quad \text{(Equation 4)}$$

In Equation 4, λ is a visible wavelength and m is an integer. The wavelength λ is sufficient only if it is a visible wavelength, for example, 550 nm providing high photopic sensitivity. Although the thickness $d_s$ of the s-polarized light high reflecting layer 53 may be a value obtainable with m set to be an integer of equal to or more than 1 in Equation 4, since an effect of wavelength dependence of a refractive index of a transparent medium contained in the s-polarized light high reflecting layer 53 is increased with increase of the thickness ds, it is preferable to select the film thickness $d_s$ calculated with m=0.

In addition, the s-polarized light high reflecting layer 53 may be made of, for example, the same material as the high refractive index layer 26 formed on the front surface 22 of the light guide plate 2 as described in the fourth embodiment. If the s-polarized light high reflecting layer 53 is formed of a single layer made of a material having a refractive index higher than that of the base material 52, when the refractive index $n_s$ of the transparent medium used as the s-polarized light high reflecting layer 53 is increased, since a loss (reflection) of p-polarized light component when the light emitted from the light guide plate 2 is incident into the prism sheet 5 is reduced and more of the s-polarized light component is reflected, it is possible to obtain light having a higher percentage of p-polarized light component, as light transmitted through the prism sheet 5. In particular, by heightening a refractive index of the outmost surface (exposed surface) in the rear side of the prism sheet 5, for light of an angle providing the maximum luminance or luminous intensity of the light emitted from the light guide plate 2, under a state where this angle satisfies the condition on Brewster's angle or under a state closer to the condition on Brewster's angle, no or little reflection loss of p-polarized light component in the rear side of the prism sheet 5 can be achieved.

In addition, while s-polarized light reflected from the rear side of the prism sheet 5 is again incident into the prism sheet 5 via the light guide plate 2 and the reflection sheet 4, its polarization state is changed by the polarization state converting structure 25 provided in the light guide plate 2 when it passes through the light guide plate 2. Accordingly, the light again incident into the prism sheet 5 via the light guide plate 2 and the reflection sheet 4 includes p-polarized light component and passes through the prism sheet 5. That is, since at least some of the s-polarized light reflected from the rear side of the prism sheet 5 is converted into p-polarized light to be used as illuminating light, the amount of p-polarized light component can be increased.

In addition, if the refractive index $n_s$ of the transparent medium used as the s-polarized light high reflecting layer 53 is increased, since variation of reflectance of the p-polarized light and the s-polarized light for a difference of the film thickness $d_s$ is increased, a manufacturing margin is decreased. Accordingly, the refractive index of the transparent medium used as the s-polarized light high reflecting layer 53 is practicable to be set to a large range of 0.2 to 0.7 as compared to the base material 52 of the prism sheet 5.

In addition, in the illuminating device 1 of the fifth embodiment, the diffusion sheet 6 may be formed on the prism sheet 5 viewed from the light guide plate 2, as necessary, as shown in FIGS. 1 and 31. The diffusion sheet 6 widens a distribution of an output angle by diffusing light emitted from the prism sheet 5 or has the ability to increase in-plane luminance uniformity. Examples of the diffusion sheet 6 may include a transparent polymer film, such as PET (polyethyleneterephthalate) or PC (polycarbonate), having unevenness formed thereon, a polymer film having a diffusion layer formed thereon, which contains transparent particles having a refractive index different from that of the transparent medium, a diffusible plate or film having bubbles therein, a transparent member, such as acrylic resin or the like, having white pigments dispersed therein, etc. In addition, since a prism formation surface of the prism sheet 5 is likely to be scratched, the diffusion sheet 6 may also act as a protection layer of the prism sheet 5.

In addition, if an optically anisotropic film such as a PET film or a PC film is used as the diffusion sheet 6, in order to realize illuminating light having a greater linearly-polarized light component, it is important to keep state of p-polarization light emitted from the prism sheet 5 by setting a slow axis of the film to be in the direction of azimuth angle θ of 0° or 90°.

In addition, the diffusion sheet 6 may change directionality of light passing therethrough by forming microlenses thereon. In addition, the diffusion sheet 6 may change directionality of light passing therethrough using a diffractive effect by forming microstructures thereon.

Sixth Embodiment

Figure 34:
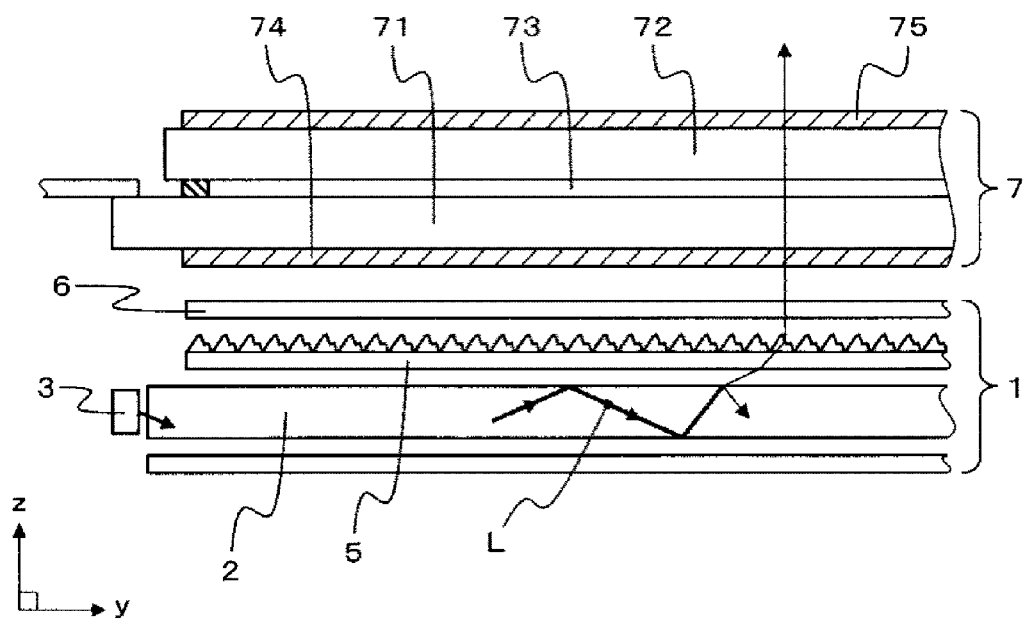
FIG. 34 is a schematic sectional view showing an example of a sectional configuration of a liquid crystal display device according to a sixth embodiment of the present invention.
Figure 35:
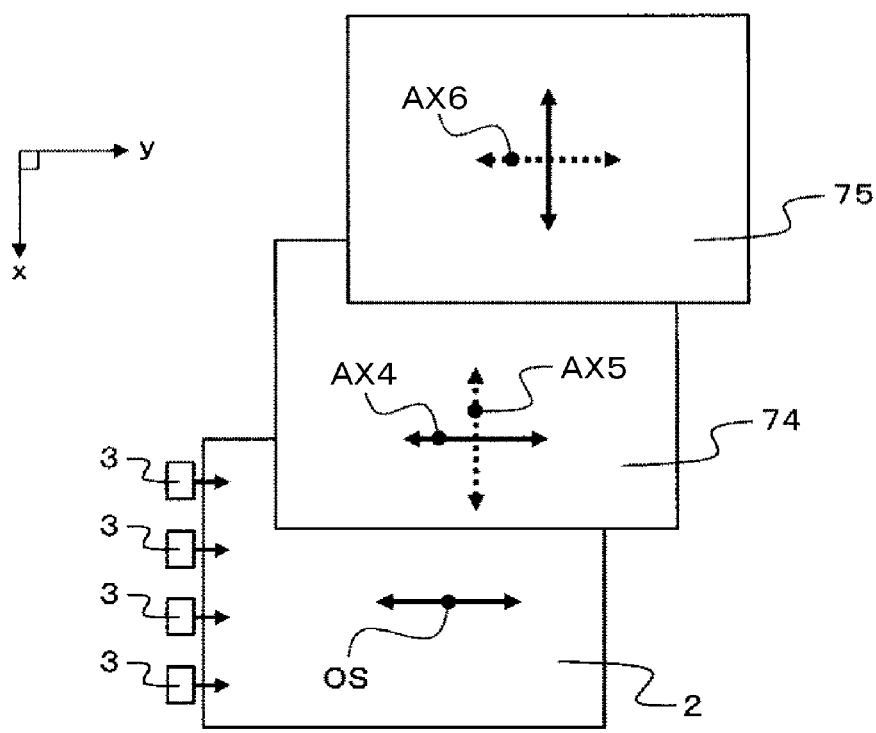
FIG. 35 is a schematic plan view showing an example of a relationship between light emitted from an illuminating device and a transmission axis of a polarizer in a liquid crystal display panel.
Figure 36:
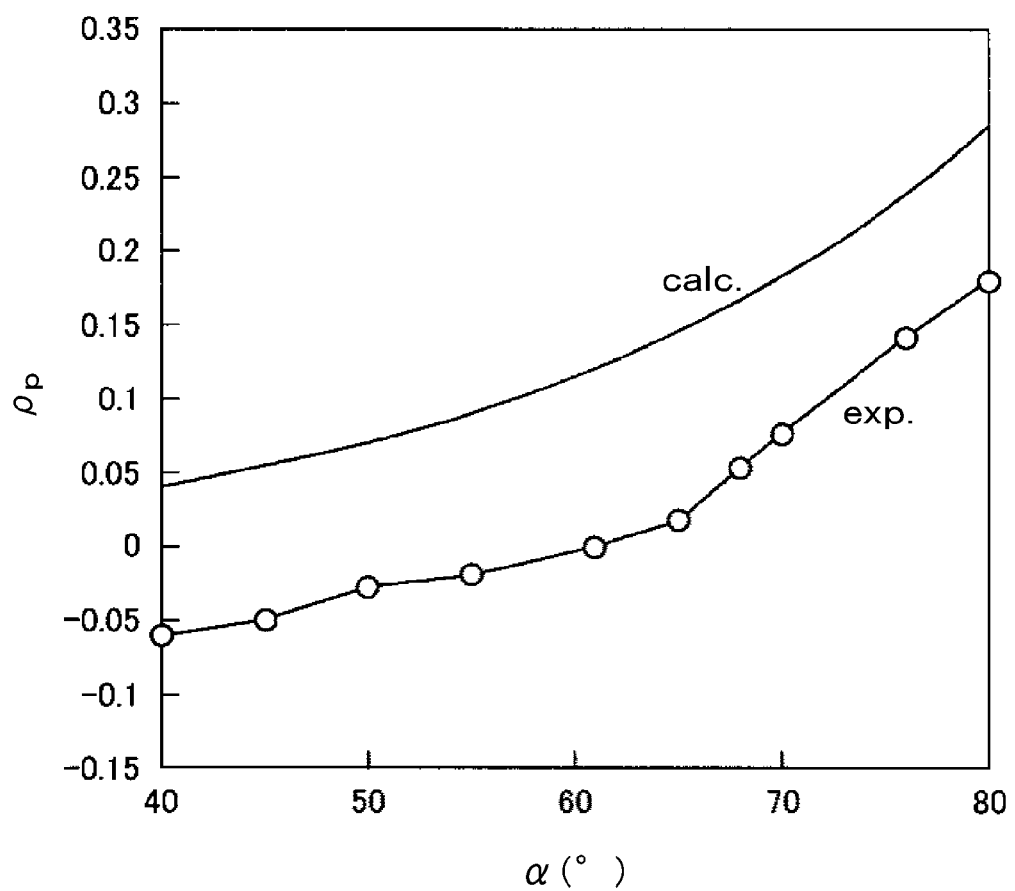
FIG. 36 is a graph showing an example of a relationship between an output angle of light emitted from a light guide plate and a degree of polarization for p-polarized light in an existing light guide plate.

FIGS. 34 and 35 are schematic views for explaining an example of a general configuration of a liquid crystal display device according to a sixth embodiment of the present invention.

FIG. 34 is a schematic sectional view showing an example of a sectional configuration of the liquid crystal display device according to the sixth embodiment of the present invention. FIG. 35 is a schematic plan view showing an example of a relationship between light emitted from an illuminating device and a transmission axis of a polarizer in a liquid crystal display panel.

FIG. 34 shows a sectional configuration viewed from a section in parallel to the yz plane in the xyz coordinate system shown in FIG. 1, that is, a section in parallel to the principal propagation direction of the light propagating through the light guide plate 2.

The illuminating device 1 of the first to fifth embodiments emits a surface light ray including a large p-polarized light component. Such an illuminating device 1 is suitable to be used as, for example, a backlight of a liquid crystal display device. Therefore, the general configuration, operation and effects of a liquid crystal display device including the illuminating device 1 of the first to fifth embodiments will be described in brief.

The liquid crystal display device of the sixth embodiment includes a liquid crystal display panel 7 and the illuminating device 1, as shown in FIG. 34. The liquid crystal display panel 7 is arranged on the diffusion sheet 6 when viewed in an emission direction of light in the illuminating device 1, that is, from the light guide plate 2.

The liquid crystal display panel 7 is a display panel which adjusts transmission of incident light and displays an image by controlling an alignment state of a liquid crystal layer, and includes a pair of substrates 71 and 72, a liquid crystal layer 73 interposed between the pair of substrates 71 and 72, and a pair of polarizers 74 and 75 arranged with the substrates 71 and 72 and the liquid crystal layer 73 interposed therebetween. The liquid crystal display panel 7 in the liquid crystal display device of the sixth embodiment may be any of liquid crystal display panels used in existing liquid crystal display devices including a backlight, for example. Therefore, in the sixth embodiment, detailed explanation regarding the configuration and operation of the liquid crystal display panel 7 will be omitted.

The illuminating device 1 may be any of the illuminating devices 1 of the first to fifth embodiments. In this case, light emitted from the illuminating device 1 and incident into the liquid crystal display panel 7 has a large p-polarized light component, as described above. That is, light emitted from the illuminating device 1 into the liquid crystal display panel 7 includes a large linearly polarized light component in parallel to an azimuth angle θ of 90° in a direction of a vibration plane OS, that is, the principal propagation direction (y-axis direction) of light in the light guide plate 2, as shown in FIG. 35.

At this time, in order to increase use efficiency of the light (backlight light) emitted from the illuminating device 1, a transmission axis AX4 in the polarizer 74 closer to the illuminating device 1, of the pair of polarizers 74 and 75 of the liquid crystal display panel 7, is set to be substantially parallel to the direction of the vibration plane OS for the light emitted from the illuminating device 1. In this case, for example, the polarizer 74 is configured such that its absorption axis AX5 is in parallel to a direction of a ridge line of the prisms 51 in the prism sheet 5 of the illuminating device 1 (the longitudinal direction of the end surface 21 of the light guide plate 2 in which the light sources 3 are arranged).

Meanwhile, for example, the polarizer 75 farther from the illuminating device 1 is configured such that its absorption axis AX6 is perpendicular to the direction of the ridge line of the prisms 51 in the prism sheet 5 of the illuminating device 1 (the direction of the absorption axis AX5 in the polarizer 74).

Although the absorption axis AX6 of the polarizer 75 is perpendicular to the absorption axis AX5 of the polarizer 74 in the example shown in FIG. 35, without being limited thereto, it is to be understood that the absorption axis AX6 of the polarizer 75 is in parallel to the absorption axis AX5 of the polarizer 74 depending on a configuration (display mode) of pixels in the liquid crystal display panel 7.

The light emitted from the illuminating device 1 includes a lot of linearly polarized light (p-polarized light) having a vibration plane OS of an electric vector in a direction (the y-axis direction in FIG. 35) perpendicular to the ridge line direction (the x-axis direction in FIG. 35) of the prisms 51 in the prism sheet 5 of the illuminating device 1, as described above. Accordingly, when the absorption axis AX5 of the polarizer 74 arranged at the illuminating device 1 side in the liquid crystal display panel 7 is set to be in parallel to the ridge line direction of the prisms 51, the amount of light absorbed and lost by the polarizer 74 can be reduced. That is, in the liquid crystal display device of the sixth embodiment, transmittance of the liquid crystal display panel 7 for the light emitted from the illuminating device 1 is increased, which may result in increased use efficiency of backlight light and a brighter image display. In addition, in the liquid crystal display device of the sixth embodiment, since the use efficiency of backlight light is improved, for example, power consumption of the illuminating device 1 (backlight) can be reduced when performing image display with the same level of brightness as in existing liquid crystal display devices.

Although the absorption axis AX5 of the polarizer 74 is in parallel to its short side in the example shown in FIG. 35, the absorption axis AX5 may be oblique to the short side of the polarizer 74 depending on configuration of pixels in the liquid crystal display panel 7. In this case, the direction of the absorption axis AX5 of the polarizer 74 is set such that an angle formed with the direction of the ridge line of the prisms 51 (the longitudinal direction of the end surface 21 of the light guide plate 2) is smaller than an angle formed with a direction perpendicular to the ridge line direction. If the absorption axis AX5 of the polarizer 74 of the liquid crystal display panel 7 is oblique to the short side, an angle formed between the absorption axis AX5 and the short side is, for example, 5° to 15° or so. Accordingly, when the polarizer 74 is set to satisfy the above conditions, use efficiency of backlight light can be increased.

While the present invention has been particularly described by way of exemplary embodiments, the present invention is not limited to the disclosed embodiments but it is to be understood that various modifications and variations may be made without departing from the scope and spirit of the invention.

For example, while it has been illustrated in the first to sixth embodiments that the light extraction structure 23 and the polarization state converting structure 25 are provided in the rear side of the plate-like base material having substantially uniform thickness in the principal propagation direction of light propagating through the light guide plate 2 as an exemplary configuration of the light guide plate 2, the configuration of the light guide plate 2 is not limited thereto but it should be understood that the light extraction structure 23 and the polarization state converting structure 25 may be provided in a rear side of a wedge-like base material having a thickness, which decreases as it gets farther away from the light sources 3, in the principal propagation direction of propagating light.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An illuminating device comprising:
a light source;
a light guide plate which converts light emitted from the light source into a surface light ray and emits the surface light ray through a front surface of the light guide plate, the light guide plate having one end surface which the light enters, the light guide plate having the light transmitted therein in a direction from the one end surface; and
an optical sheet which changes a propagation direction of the surface light ray emitted from the light guide plate,
wherein the light source is disposed in opposition to the one end surface of the light guide plate,
wherein the light guide plate has birefringence in at least an in-plane direction of the front surface and comprises a transparent medium having a slow axis in parallel to a longitudinal direction of the one end surface of the light guide plate,
wherein a polarization state converting structure to convert a polarization state of the light propagating through the light guide plate is provided in a rear surface of the light guide plate, and
wherein the polarization state converting structure includes at least one first incline surface and at least one first decline surface, the first incline surface and the first decline surface meeting at a first ridge line extending in a direction perpendicular to the longitudinal direction of the one end surface of the light guide plate.

2. The illuminating device according to claim 1,
wherein the optical sheet includes a base material and a prism array containing a plurality of prisms which are provided in a surface of the base material facing the light guide plate or a different surface opposing the surface of the base material facing the light guide plate,
wherein each of the prisms has at least one second incline surface and at least one second decline surface, the second incline surface and the second decline surface meeting at a second ridge line extending in a direction parallel to the longitudinal direction of the one end surface in the light guide plate, and
wherein the base material includes a transparent medium which produces no phase difference for p-polarized light emitted from the light guide plate and incident into the base material at a predetermined incident angle.

3. The illuminating device according to claim 2,
wherein the transparent medium included in the base material has birefringence in an in-plane direction in which the prism array is provided.

4. The illuminating device according to claim 2,
wherein the transparent medium included in the base material has biaxial anisotropy.

5. The illuminating device according to claim 1,
wherein the optical sheet includes a base material, a prism array containing a plurality of prisms provided in a surface of the base material opposing the light guide plate, and an s-polarized light high reflecting layer provided in a surface of the base material facing the light guide plate,
wherein each of the prisms has at least one second incline surface and at least one second decline surface, the second incline surface and the second decline surface meeting at a second ridge line extending in a direction parallel to the longitudinal direction of the one end surface in the light guide plate,
wherein the base material includes a transparent medium which produces no phase difference for p-polarized light emitted from the light guide plate and incident into the base material at a predetermined incident angle, and
wherein the s-polarized light high reflecting layer includes a transparent medium which reflects an s-polarized light component of light emitted from the light guide plate and incident into the s-polarized light high reflecting layer at a predetermined incident angle in order to increase a percentage of p-polarized light component in light transmitted through the optical sheet.

6. The illuminating device according to claim 5,
wherein the s-polarized light high reflecting layer has a thickness varying dependent on a predetermined angle and contains a layer made of a transparent material having a refractive index higher than the refractive index of the base material in the optical sheet.

7. The illuminating device according to claim 1,
wherein the polarization state converting structure is configured so that the inclination plane reflects a s-polarized light which has an electric vector vibration vibrating along the longitudinal direction of the one end surface of the light guide plate.

8. The illuminating device according to claim 1, further comprising:
a light extraction structure provided in the rear surface of the light guide plate,
wherein the light extraction structure comprises at least one second incline surface and at least one second decline surface, the second incline surface and the second decline surface meeting at a second ridge line extending in a direction parallel to the longitudinal direction of the one end surface of the light guide plate.

9. The illuminating device according to claim 8,
wherein among the rear surface of the light guide plate, an area where the polarization state converting structure is provided is different from an area where the light extraction structure is provided, and the light extraction structure comprises
any of fine steps, unevenness, lenticules or dot-printing with white pigments.

10. The illuminating device according to claim 9, wherein the light extraction structure is a first light extraction structure, and the illuminating device further comprises a second light extraction structure, and
wherein the area where the polarization state converting structure is provided is between a first area having the first light extraction structure and a second area having a second light extraction structure.

11. The illuminating device according to claim 8, wherein the polarization state converting structure is a first polarization state converting structure, and the rear surface of the light guide plate is further provided with a second polarization state converting structure to convert the polarization state of the light propagating through the light guide plate,
wherein the second polarization state converting structure comprises at least one third incline surface and at least one third decline surface, the third incline surface and the third decline surface meeting at a third ridge line extending in a direction perpendicular to the longitudinal direction of the one end surface of the light guide plate, and
wherein the light extraction structure separates the first ridge line and the third ridge line.

12. The illuminating device according to claim 11, wherein the second ridge line is between the first ridge line and the third ridge line.

13. The illuminating device according to claim 11, wherein the second ridge line extends across an entirety of the rear surface of the light guide plate.

14. The illuminating device according to claim 11, wherein the first ridge line and the third ridge line are substantially aligned along the direction perpendicular to the longitudinal direction of the one end surface of the light guide plate.

15. A liquid crystal display device comprising:
a liquid crystal display panel;
the illuminating an illuminating device according to claim 1; and
a high refractive index layer formed on the front surface of the light guide plate, the high refractive index layer having a refractive index higher than a refractive index of the light guide plate,
wherein the liquid crystal display panel is arranged in the propagation direction of the surface light ray emitted from the illuminating device,
wherein the liquid crystal display panel includes a pair of polarizers arranged with a liquid crystal layer interposed between the pair of polarizers, and
wherein one of the pair of polarizers arranged closer to the illuminating device has an absorption axis which is perpendicular to the direction in which the light is transmitted in the light guide plate.

* * * * *